(12) United States Patent
Ito et al.

(10) Patent No.: US 11,467,259 B2
(45) Date of Patent: Oct. 11, 2022

(54) OPTICAL SCANNING APPARATUS, METHOD FOR CONTROLLING SAME, AND VEHICLE

(71) Applicant: Mitsubishi Electric Corporation, Chiyoda-ku (JP)

(72) Inventors: Takahiko Ito, Chiyoda-ku (JP); Nobuaki Konno, Chiyoda-ku (JP); Yoshiaki Hirata, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 409 days.

(21) Appl. No.: 16/499,458

(22) PCT Filed: Jan. 18, 2018

(86) PCT No.: PCT/JP2018/001336
§ 371 (c)(1),
(2) Date: Sep. 30, 2019

(87) PCT Pub. No.: WO2018/230024
PCT Pub. Date: Dec. 20, 2018

(65) Prior Publication Data
US 2020/0096611 A1 Mar. 26, 2020

(30) Foreign Application Priority Data
Jun. 14, 2017 (JP) ............................. JP2017-116746

(51) Int. Cl.
| | | |
|---|---|---|
| G01S 17/93 | (2020.01) | |
| G01S 7/481 | (2006.01) | |
| G01S 17/931 | (2020.01) | |
| G01C 5/00 | (2006.01) | |
| G02B 5/08 | (2006.01) | |

(52) U.S. Cl.
CPC .............. *G01S 7/4811* (2013.01); *G01C 5/00* (2013.01); *G01S 17/931* (2020.01); *G02B 5/08* (2013.01)

(58) Field of Classification Search
None
See application file for complete search history.

(56) References Cited

FOREIGN PATENT DOCUMENTS

| JP | 2002-62345 A | 2/2002 |
|---|---|---|
| JP | 2003-198943 A | 7/2003 |
| JP | 2008-55436 A | 3/2008 |
| JP | 2008-310204 A | 12/2008 |

OTHER PUBLICATIONS

International Search Report dated Apr. 10, 2018 in PCT/JP2018/001336 filed on Jan. 18, 2018.

*Primary Examiner* — Hovhannes Baghdasaryan
(74) *Attorney, Agent, or Firm* — Xsensus LLP

(57) ABSTRACT

An optical scanning apparatus includes a light source, a substrate, a reflection member, a drive unit, and a controller. A scanning mirror and an attitude detector are integrated with substrate. An attitude detector outputs a first signal according to an attitude angle of substrate. A reflection member reflects a light beam reflected by scanning mirror. A drive unit can adjust an inclination of reflection member with respect to a main surface of substrate. A controller controls drive unit based on first signal. For this reason, an outgoing angle of light beam from optical scanning apparatus with respect to a horizontal surface can stably be maintained regardless of the inclination of optical scanning apparatus with respect to horizontal surface.

17 Claims, 19 Drawing Sheets

OPTICAL SCANNING APPARATUS, METHOD FOR CONTROLLING SAME, AND VEHICLE

TECHNICAL FIELD

The present invention relates to an optical scanning apparatus, a method for controlling the optical scanning apparatus, and a vehicle.

BACKGROUND ART

Japanese Patent Laying-Open No. 2008-310204 (PTL 1) discloses an optical scanning apparatus including a light source unit that generates a light beam and optical scanning means disposed on a propagation axis of the light beam.

CITATION LIST

Patent Literature

PTL 1: Japanese Patent Laying-Open No. 2008-310204

SUMMARY OF INVENTION

Technical Problem

However, the optical scanning apparatus disclosed in PTL 1 has a problem in that an outgoing angle of the light beam from the optical scanning apparatus with respect to a horizontal surface changes when the optical scanning apparatus is inclined with respect to the horizontal surface. The present invention has been made in view of the above problem, and an object of the present invention is to provide an optical scanning apparatus that can stably maintain an outgoing angle of a light beam from the optical scanning apparatus with respect to a horizontal surface regardless of inclination of the optical scanning apparatus with respect to the horizontal surface, and a method for controlling the optical scanning apparatus. Another object of the present invention is to provide a vehicle including the optical scanning apparatus.

Solution to Problem

An optical scanning apparatus according to the present invention includes a light source and a substrate. A scanning mirror and an attitude detector are integrated with the substrate. The scanning mirror is configured to reflect a light beam emitted from the light source and perform scanning with the light beam. The scanning mirror is provided on a main surface of the substrate. The attitude detector is configured to output a first signal according to an attitude angle of the substrate. The optical scanning apparatus further includes a reflection member, a drive unit, and a controller. The reflection member is configured to reflect the light beam reflected by the scanning mirror. The drive unit is configured to adjust an inclination of the reflection member with respect to the main surface of the substrate. The controller is configured to control the drive unit based on the first signal.

A vehicle according to the present invention includes the optical scanning apparatus according to the present invention.

In a method for controlling an optical scanning apparatus according to the present invention, the optical scanning apparatus includes a light source, a substrate, and a reflection member. A scanning mirror and an attitude detector are integrated with the substrate. The scanning mirror reflects a light beam emitted from the light source and performs scanning with the light beam. The scanning mirror is provided on a main surface of the substrate. The reflection member reflects the light beam reflected by the scanning mirror. The method for controlling the optical scanning apparatus includes outputting a first signal according to an attitude angle of the substrate using the attitude detector and adjusting an inclination of the reflection member with respect to the main surface of the substrate based on the first signal.

Advantageous Effects of Invention

In the optical scanning apparatus according to the prevent invention, the inclination of the reflection member with respect to the main surface of the substrate can be adjusted based on the first signal output from the attitude detector according to the attitude angle of the substrate. Because the scanning mirror and the attitude detector are integrated with the substrate, the position and inclination of the attitude detector with respect to the optical system of the optical scanning apparatus including the scanning mirror are substantially unchanged. For this reason, the attitude detector can stably and accurately detect the attitude of the optical system of the optical scanning apparatus including the scanning mirror with respect to the horizontal surface. In the optical scanning apparatus according to the present invention, the outgoing angle of the light beam from the optical scanning apparatus with respect to the horizontal surface can stably be maintained, regardless of inclination of the optical scanning apparatus with respect to the horizontal surface.

In the vehicle according to the present invention, the inclination of the reflection member with respect to the main surface of the substrate can be adjusted based on the first signal output from the attitude detector according to the attitude angle of the substrate. Because the scanning mirror and the attitude detector are integrated with the substrate, the position and inclination of the attitude detector with respect to the optical system of the optical scanning apparatus including the scanning mirror are substantially unchanged. For this reason, the attitude detector can stably and accurately detect the attitude of the optical system of the optical scanning apparatus including the scanning mirror with respect to the horizontal surface. In the vehicle according to the present invention, the outgoing angle of the light beam from the optical scanning apparatus with respect to the horizontal surface can stably be maintained even if the vehicle into which the optical scanning apparatus is incorporated moves on an inclined surface.

In the method for controlling the optical scanning apparatus according to the prevent invention, the inclination of the reflection member with respect to the main surface of the substrate can be adjusted based on the first signal output from the attitude detector according to the attitude angle of the substrate. Because the scanning mirror and the attitude detector are integrated with the substrate, the position and inclination of the attitude detector with respect to the optical system of the optical scanning apparatus including the scanning mirror are substantially unchanged. For this reason, the attitude detector can stably and accurately detect the attitude of the optical system of the optical scanning apparatus including the scanning mirror with respect to the horizontal surface. In the method for controlling the optical scanning apparatus according to an embodiment, the outgoing angle of the light beam from the optical scanning apparatus with respect to the horizontal surface can stably be maintained regardless of the inclination of the optical scanning apparatus with respect to the horizontal surface.

DESCRIPTION OF EMBODIMENTS

Figure 1:
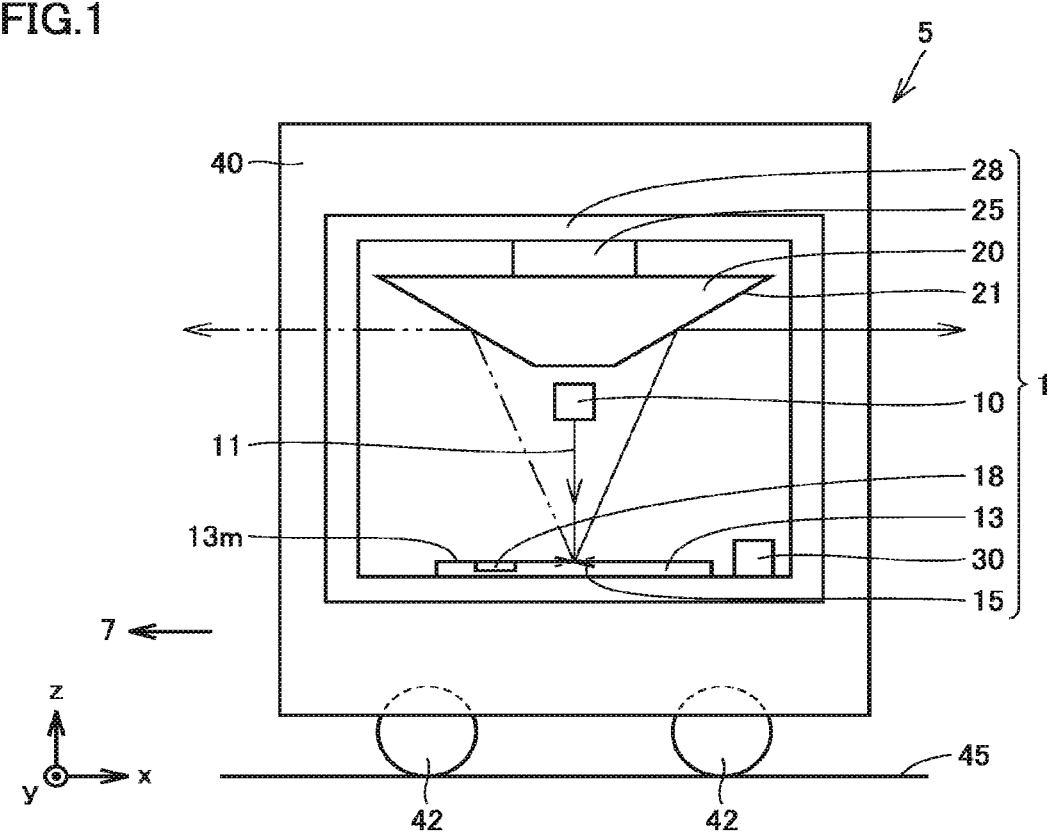
FIG. 1 is a side view schematically illustrating an optical scanning apparatus according to a first embodiment of the present invention.

Hereinafter, embodiments of the present invention will be described. The same components are designated by the same reference numerals, and the overlapping description will be omitted.

First Embodiment

With reference to FIGS. 1 to 24, 26, and 27, an optical scanning apparatus 1 and a vehicle 5 according to a first embodiment will be described. Optical scanning apparatus 1 of the first embodiment mainly includes a light source 10, a substrate 13, a reflection member 20, a first drive unit 25, and a controller 30. Optical scanning apparatus 1 of the first embodiment may further include a casing 28. Vehicle 5 of the first embodiment mainly includes optical scanning apparatus 1. Vehicle 5 of the first embodiment may further include a main body 40 and wheels 42.

Figure 2:
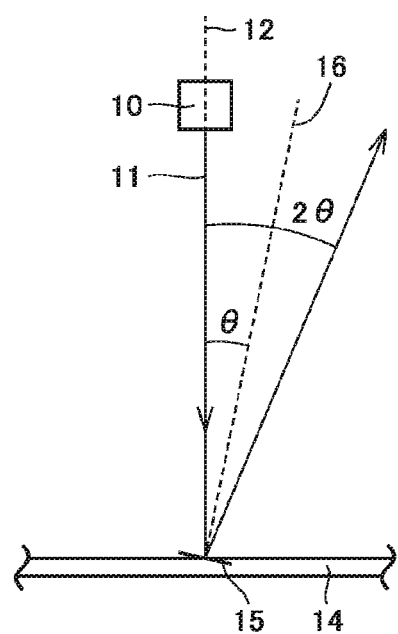
FIG. 2 is a partially enlarged side view schematically illustrating a light source and a scanning mirror included in the optical scanning apparatus according to the first embodiment of the present invention.

As illustrated in FIGS. 1 and 2, light source 10 is configured to emit a light beam 11. Specifically, light source 10 emits light beam 11 toward a scanning mirror 15 along a third direction (for example, a z-direction) parallel to a normal to a main surface 13m of substrate 13. An optical axis 12 of light beam 11 emitted from light source 10 may be parallel to the third direction (for example, the z-direction). When vehicle 5 in which optical scanning apparatus 1 is incorporated moves on a horizontal surface 45, or when vehicle 5 stands still on horizontal surface 45, the third direction (for example, the z-direction) may be a gravity direction. Light source 10 is not particularly limited, but may be a laser light source such as a laser diode (LD), or a light emitting diode (LED) element. Light beam 11 emitted from light source 10 may be converted into a parallel light beam by a collimator lens (not illustrated).

Figure 6:
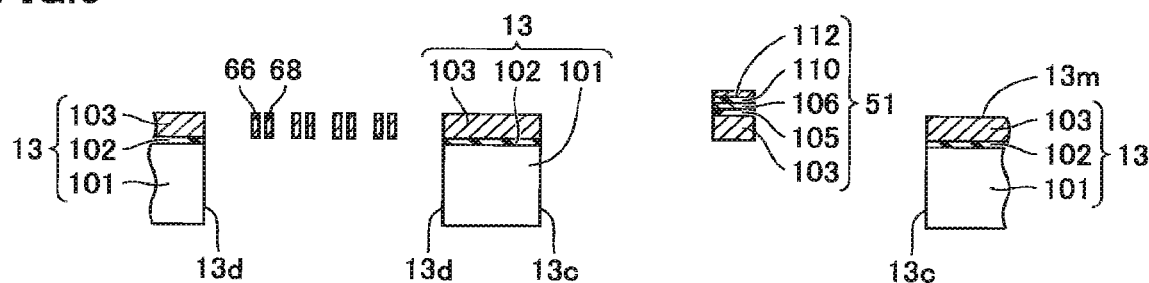
FIG. 6 is a sectional view taken along a line VI-VI in FIG. 5, and schematically illustrating the scanning mirror and the attitude detector included in the optical scanning apparatus according to the first embodiment of the present invention.
Figure 7:
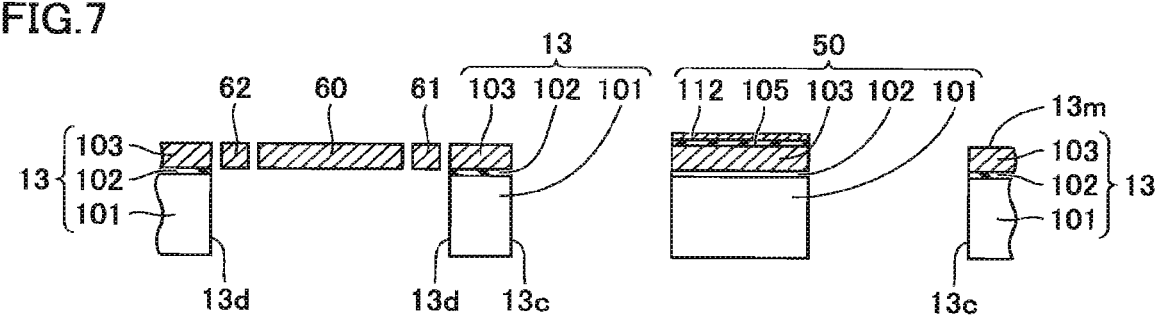
FIG. 7 is a sectional view taken along a line VII-VII in FIG. 5, and schematically illustrating the scanning mirror and the attitude detector included in the optical scanning apparatus according to the first embodiment of the present invention.
Figure 8:
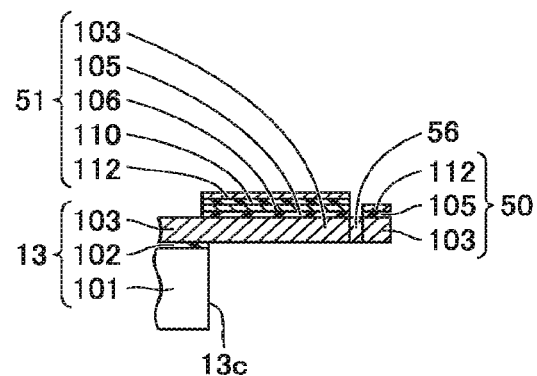
FIG. 8 is a sectional view taken along a line VIII-VIII in FIG. 5, and schematically illustrating the scanning mirror included in the optical scanning apparatus according to the first embodiment of the present invention.

As illustrated in FIGS. 6 to 8, substrate 13 is not particularly limited, but may be a silicon on insulator (SOI) substrate. Specifically, substrate 13 may include a nonconductive substrate 101, a first insulating layer 102 provided on nonconductive substrate 101, and a first conductive semiconductor layer 103 provided on first insulating layer 102. For example, nonconductive substrate 101 may be a nonconductive single crystal silicon substrate. For example, first insulating layer 102 may be a silicon dioxide layer. First conductive semiconductor layer 103 may be a conductive single crystal silicon layer. Substrate 13 includes main surface 13m. Main surface 13m extends in a first direction (for example, an x-direction) and in a second direction (for example, a y-direction) orthogonal to the first direction. When vehicle 5 into which optical scanning apparatus 1 is incorporated moves on horizontal surface 45, for example, the first direction (for example, the x-direction) may be a traveling direction 7 of vehicle 5, and the second direction (for example, the y-direction) may be a width direction of vehicle 5 orthogonal to the traveling direction 7 of vehicle 5 and the gravity direction. In the description, an xyz-coordinate system is fixed to substrate 13.

As illustrated in FIGS. 1, 2, and 5 to 8, scanning mirror 15 and an attitude detector 18 are integrated with substrate 13.

Scanning mirror 15 is configured to reflect light beam 11 emitted from light source 10 and perform scanning with light beam 11. Scanning mirror 15 is provided on main surface 13m of substrate 13. Scanning mirror 15 may be a one-dimensional scanning mirror or a two-dimensional scanning mirror as illustrated in FIGS. 1, 2, and 5 to 8. Specifically, scanning mirror 15 is provided in a first opening 13c of substrate 13. Scanning mirror 15 may include a reflection mirror 50 and a second drive unit (51, 52, 53) that drives reflection mirror 50. Second drive unit (51, 52, 53) is not particularly limited, but may include first beams 51, 52, 53 that can be deformed in the third direction (for example, the z-direction). First beams 51, 52, 53 are connected to substrate 13, and support reflection mirror 50. Second drive unit (51, 52, 53) may drive reflection mirror 50 using electrostatic attraction or electromagnetic force.

Specifically, reflection mirror 50 includes a reflection film (112) Reflection mirror 50 may further include nonconductive substrate 101, first insulating layer 102 provided on nonconductive substrate 101, first conductive semiconductor layer 103 provided on first insulating layer 102, and a second insulating layer 105 provided on first conductive semiconductor layer 103, and reflection film (112) may be provided on second insulating layer 105. Consequently, deflection of reflection film (112) can be reduced. For example, second insulating layer 105 may be a silicon dioxide layer. Reflection film (112) is not particularly limited, but may be a gold layer 112. In planar view of main surface 13m of substrate 13, reflection mirror 50 and reflection film (112) are not particularly limited, but may have a circular shape. First beams 51, 52, 53 are respectively connected to reflection mirror 50 with connection units 56, 57, 58 interposed therebetween.

First beam 51 may include first conductive semiconductor layer 103, second insulating layer 105 provided on first conductive semiconductor layer 103, a first electrode layer 106 provided on second insulating layer 105, a piezoelectric layer 110 provided on first electrode layer 106, and a second electrode layer (112) provided on piezoelectric layer 110. For example, first electrode layer 106 may be a platinum (Pt) layer. For example, piezoelectric layer 110 may be made of a piezoelectric material such as lead zirconate titanate (PZT). For example, second electrode layer (112) may be gold layer 112. First beams 52, 53 are configured in the same manner as first beam 51.

Figure 23:
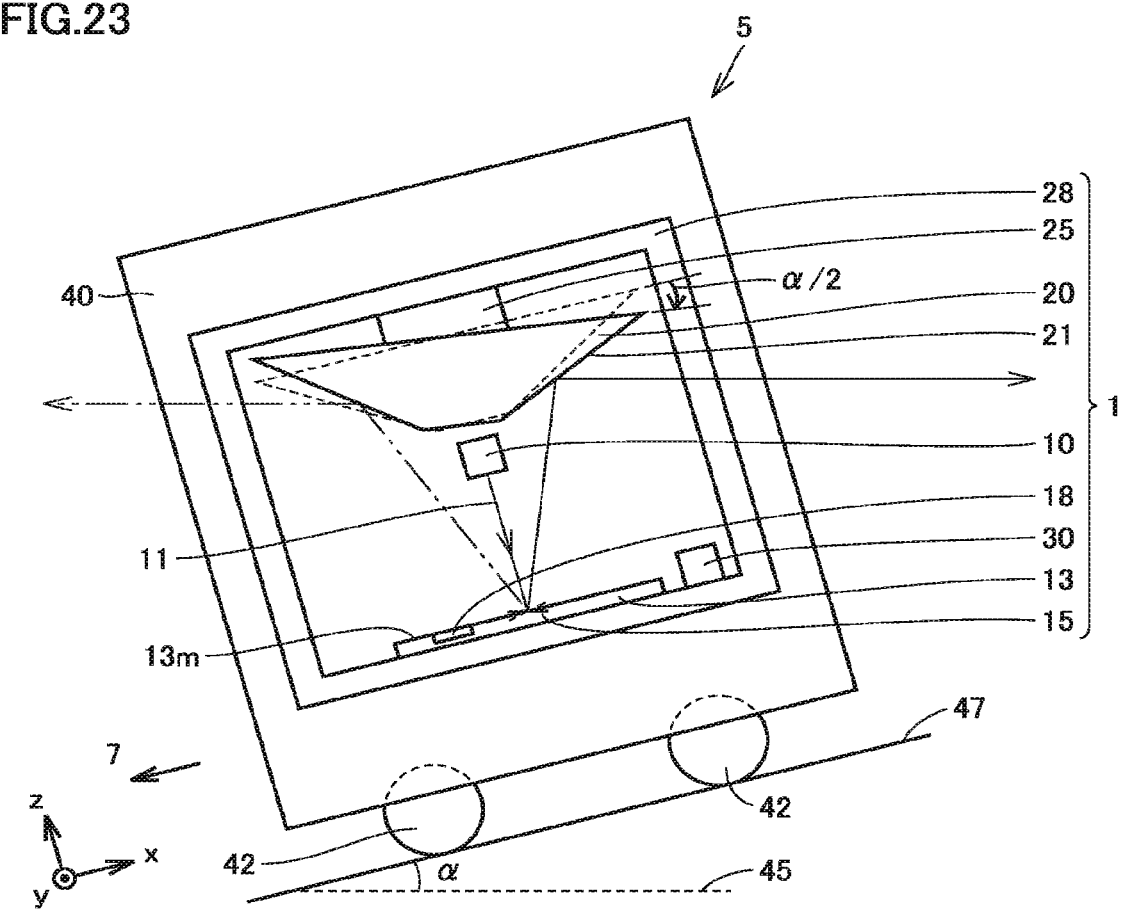
FIG. 23 is a side view schematically illustrating the optical scanning apparatus according to the first embodiment of the present invention.

As illustrated in FIGS. 1 and 23, scanning mirror 15 (reflection mirror 50) may be configured to perform swing motion about optical axis 12 of light beam 11 incident on scanning mirror 15 (reflection mirror 50) while an incident angle θ of light beam 11 with respect to scanning mirror 15 (reflection mirror 50) is maintained. That is, scanning mirror 15 (reflection mirror 50) may be rotated about optical axis 12 of light beam 11 incident on scanning mirror 15 (reflection mirror 50) with the center of scanning mirror 15 (reflection mirror 50) as the center, while being inclined at a constant incident angle θ with respect to light beam 11 incident on scanning mirror 15 (reflection mirror 50). Specifically, AC voltage having the same frequency, the same amplitude, and phases different from one another by 120° may be applied to second electrode layer (112) of first beam 51, second electrode layer (112) of first beam 52, and second electrode layer (112) of first beam 53. As illustrated in FIG. 2, the incident angle θ is defined as an angle between optical axis 12 of light beam 11 emitted from light source 10 and a normal 16 of scanning mirror 15 (reflection mirror 50). An angle between light beam 11 reflected by scanning mirror 15 (reflection mirror 50) and optical axis 12 of light beam 11 emitted from light source 10 is given by 2θ.

Attitude detector 18 is configured to output a first signal 31 according to an attitude angle of substrate 13. The attitude angle of substrate 13 is defined as an angle formed by main surface 13m of substrate 13 with respect to horizontal surface 45. Specifically, attitude detector 18 may be configured to output first signal 31 according to the attitude angle of substrate 13 in one direction in main surface 13m of substrate 13. In the first embodiment, the one direction may be the first direction (for example, the x-direction). In a modification of the first embodiment, the one direction may be the second direction (for example, the y-direction). Scanning mirror 15 and attitude detector 18 are integrated with substrate 13. Scanning mirror 15 is included in an optical system of optical scanning apparatus 1. For this reason, the attitude angle of substrate 13 detected by attitude detector 18 also serves as the attitude angle of the optical system of optical scanning apparatus 1 with respect to horizontal surface 45. That is, attitude detector 18 can detect the attitude angle of the optical system of optical scanning apparatus 1 including scanning mirror 15 with respect to horizontal surface 45.

Attitude detector 18 may include either an acceleration sensor or an inclinometer. The inclinometer is not particularly limited, but may be a liquid surface type inclination angle sensor or a pendulum type inclination angle sensor. The liquid surface type inclination angle sensor detects an inclination angle of an object from the inclination angle of a container with respect to the surface of a liquid such as silicone oil enclosed in the container. The pendulum type inclination angle sensor detects an inclination angle of an object from the inclination angle of a container with respect to the pendulum installed in the container.

Figure 5:
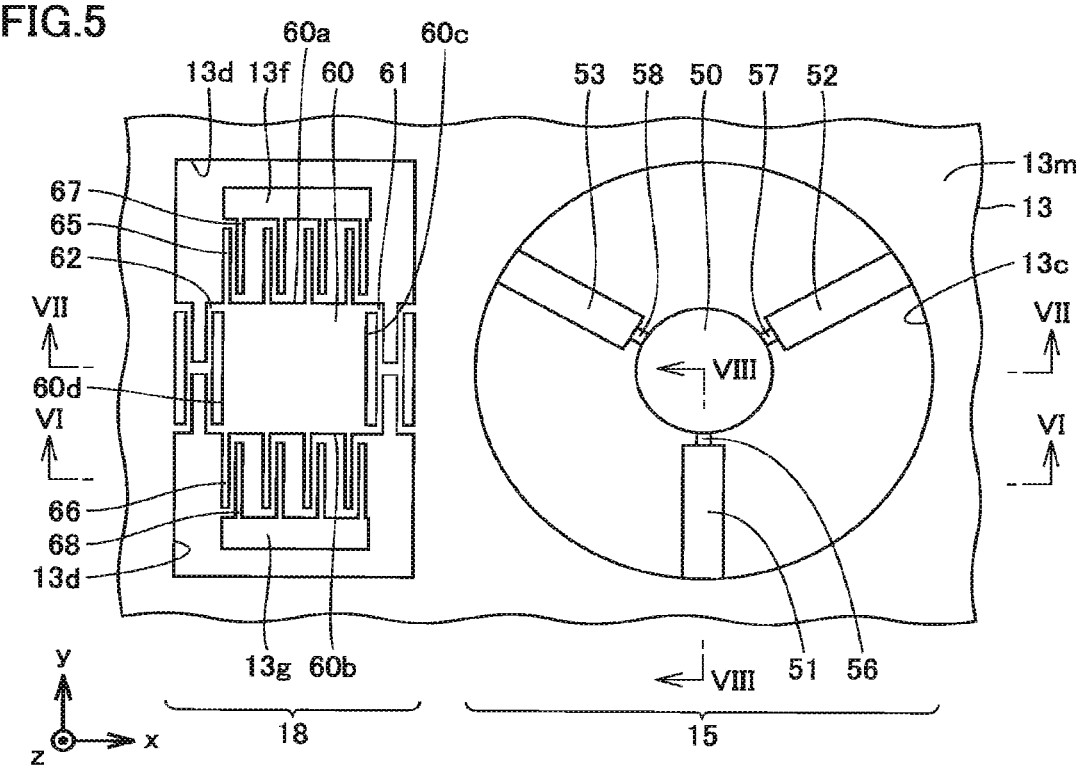
FIG. 5 is a partially enlarged plan view schematically illustrating a scanning mirror and an attitude detector included in the optical scanning apparatus according to the first embodiment of the present invention.

As illustrated in FIGS. 5 to 7, attitude detector 18 may be a micro-electro-mechanical systems (MEMS) acceleration sensor. Specifically, attitude detector 18 is provided in a second opening 13d of substrate 13. Attitude detector 18 includes an inertial mass body 60, second beams 61, 62 that are connected to the substrate 13 while supporting inertial mass body 60, and first movable interdigital electrodes 65, 66 connected to inertial mass body 60, and first fixed interdigital electrodes 67, 68 that are respectively connected to first fixed units 13f, 13g of substrate 13 provided in second opening 13d.

Specifically, inertial mass body 60 may include first conductive semiconductor layer 103. Inertial mass body 60 includes a first side surface 60a, a second side surface 60b on an opposite side to first side surface 60a, a third side surface 60c connecting first side surface 60a and second side surface 60b, and a fourth side surface 60d on an opposite side to third side surface 60c. Fourth side surface 60d connects first side surface 60a and second side surface 60b. Second beams 61, 62 may include first conductive semiconductor layer 103. Second beams 61, 62 may be configured such that inertial mass body 60 can be displaced in the first direction (for example, the x-direction). Second beam 61 connects third side surface 60c of inertial mass body 60 and substrate 13. Second beam 62 connects fourth side surface 60d of inertial mass body 60 and substrate 13.

First movable interdigital electrodes 65, 66 may include first conductive semiconductor layer 103. First movable interdigital electrode 65 may extend in the second direction (for example, the y-direction) from first side surface 60a of inertial mass body 60. First movable interdigital electrode 65 is separated from first fixed unit 13f in the second direction (for example, the y-direction). First movable interdigital electrode 66 may extend in the second direction (for example, the y-direction) from second side surface 60b of inertial mass body 60. First movable interdigital electrode 66 is separated from first fixed unit 13g in the second direction (for example, the y direction).

In planar view of main surface 13m of substrate 13, inertial mass body 60 is disposed between first fixed unit 13f and first fixed unit 13g. First fixed unit 13f, inertial mass body 60, and first fixed unit 13g are disposed in this order in the second direction (for example, the y-direction). First fixed units 13f, 13g may include nonconductive substrate 101, first insulating layer 102 provided on nonconductive substrate 101, and first conductive semiconductor layer 103 provided on first insulating layer 102.

First fixed interdigital electrodes 67, 68 may include first conductive semiconductor layer 103. First fixed interdigital electrode 67 may extend in the second direction (for example, the y-direction) from first fixed unit 13f. First fixed interdigital electrode 67 is separated from inertial mass body 60 in the second direction (for example, the y-direction). First fixed unit 13f and first fixed interdigital electrode 67 face first side surface 60a of inertial mass body 60. First fixed interdigital electrode 68 may extend in the second direction (for example, the y-direction) from first fixed unit 13g. First fixed interdigital electrode 68 is separated from inertial mass body 60 in the second direction (for example, the y-direction). First fixed unit 13g and first fixed interdigital electrode 68 face second side surface 60b of inertial mass body 60.

First fixed interdigital electrode 67 is separated from first movable interdigital electrode 65 in the first direction (for example, the x-direction). First movable interdigital electrode 65 and first fixed interdigital electrode 67 may be disposed so as to overlap each other when viewed from the first direction (for example, the x-direction). Capacitance is formed between first movable interdigital electrode 65 and first fixed interdigital electrode 67. First fixed interdigital electrode 68 is separated from first movable interdigital electrode 66 in the first direction (for example, the x-direction). First movable interdigital electrode 66 and first fixed interdigital electrode 68 may be disposed so as to overlap each other when viewed from the first direction (for example, the x-direction). Capacitance is formed between first movable interdigital electrode 66 and first fixed interdigital electrode 68.

Figure 24:
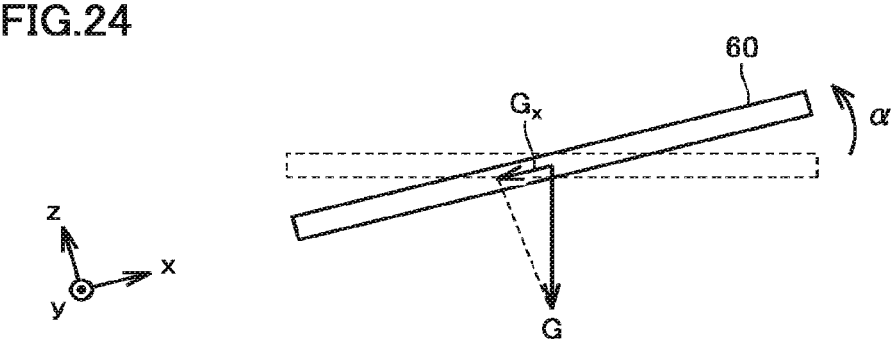
FIG. 24 is a partially enlarged side view schematically illustrating the attitude detector included in the optical scanning apparatus according to the first embodiment of the present invention.

Although described later in detail, as illustrated in FIGS. 23 and 24, a gap between first movable interdigital electrodes 65, 66 and first fixed interdigital electrodes 67, 68 changes according to an inclination angle ($\alpha$) of substrate 13 with respect to horizontal surface 45 in the first direction (for example, the x-direction), namely, the inclination angle ($\alpha$) of optical scanning apparatus 1 with respect to the horizontal surface 45. The inclination angle ($\alpha$) of substrate 13 with respect to horizontal surface 45 in the first direction (for example, the x-direction) is detected as a change in capacitance formed between first movable interdigital electrodes 65, 66 and first fixed interdigital electrodes 67, 68. In the first embodiment, attitude detector 18 is an acceleration sensor that can detect the change in capacitance. For example, attitude detector 18 may be a strain gauge, or an acceleration sensor that can detect a change in electrical resistance due to a piezoelectric effect of the semiconductor material.

With reference to FIGS. 5 to 22, an example of a method for manufacturing scanning mirror 15 and attitude detector 18 that are included in optical scanning apparatus 1 will be described.

Figure 9:
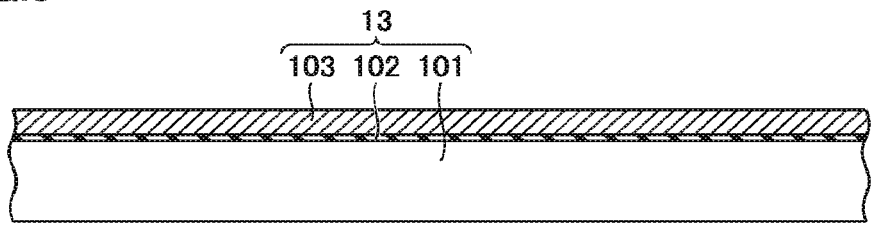
FIG. 9 is a partially enlarged sectional view schematically illustrating a process in a method for manufacturing a portion illustrated in FIG. 6 of the scanning mirror and the attitude detector included in the optical scanning apparatus according to the first embodiment of the present invention.
Figure 10:
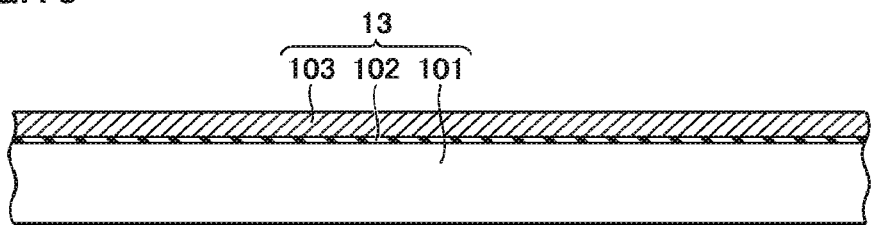
FIG. 10 is a partially enlarged sectional view schematically illustrating a process in the method for manufacturing a portion illustrated in FIG. 7 of the scanning mirror and the attitude detector included in the optical scanning apparatus according to the first embodiment of the present invention.

As illustrated in FIGS. 9 and 10, the method for manufacturing scanning mirror 15 and attitude detector 18 of the first embodiment includes preparing substrate 13. Substrate 13 is not particularly limited, but may be a silicon on insulator (SOI) substrate 13. Specifically, substrate 13 may include a nonconductive substrate 101, a first insulating layer 102 provided on nonconductive substrate 101, and a first conductive semiconductor layer 103 provided on first insulating layer 102.

Figure 11:
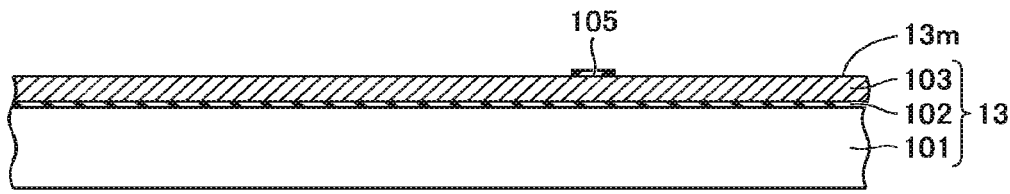
FIG. 11 is a partially enlarged plan view schematically illustrating a process next to the process illustrated in FIG. 9 in the method for manufacturing the scanning mirror and the attitude detector included in the optical scanning apparatus according to the first embodiment of the present invention.
Figure 12:
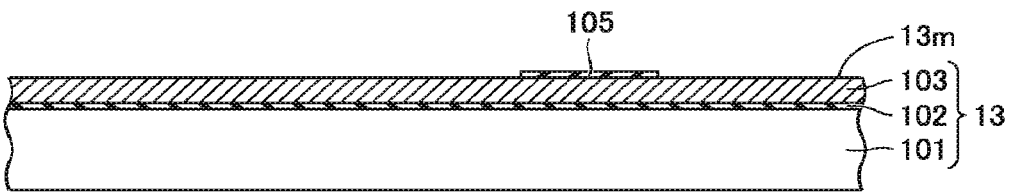
FIG. 12 is a partially enlarged plan view schematically illustrating a process next to the process illustrated in FIG. 10 in the method for manufacturing the scanning mirror and the attitude detector included in the optical scanning apparatus according to the first embodiment of the present invention.

As illustrated in FIGS. 11 and 12, the method for manufacturing scanning mirror 15 and attitude detector 18 of the first embodiment includes forming patterned second insulating layer 105 on first conductive semiconductor layer 103. Second insulating layer 105 is formed on the whole surface of first conductive semiconductor layer 103, and a part of second insulating layer 105 may be removed by a photolithography process and an etching process to pattern second insulating layer 105. For example, second insulating layer 105 may be a silicon dioxide layer.

Figure 13:
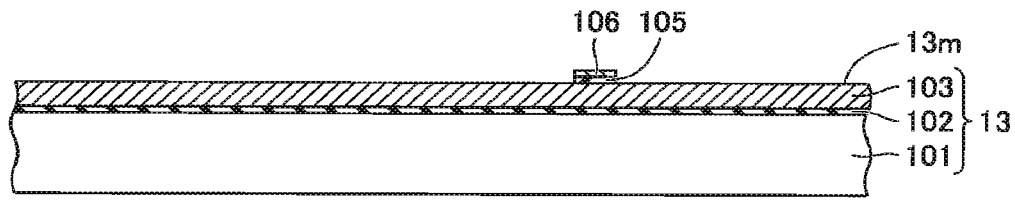
FIG. 13 is a partially enlarged plan view schematically illustrating a process next to the process illustrated in FIG. 11 in the method for manufacturing the scanning mirror and the attitude detector included in the optical scanning apparatus according to the first embodiment of the present invention.
Figure 14:
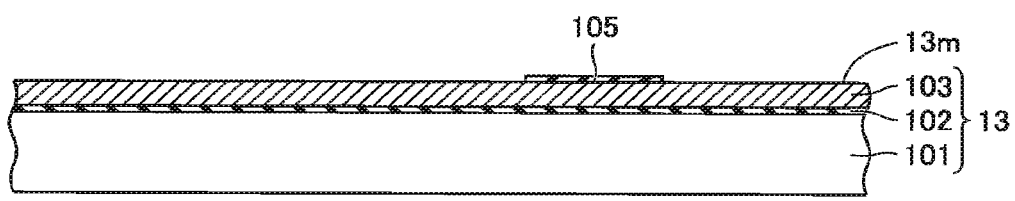
FIG. 14 is a partially enlarged plan view schematically illustrating a process next to the process illustrated in FIG. 12 in the method for manufacturing the scanning mirror and the attitude detector included in the optical scanning apparatus according to the first embodiment of the present invention.

As illustrated in FIG. 13, the method for manufacturing scanning mirror 15 and attitude detector 18 of the first embodiment includes forming first electrode layer 106 on second insulating layer 105 included in the first beams 51, 52, 53. As illustrated in FIG. 14, first electrode layer 106 is not formed on second insulating layer 105 included in reflection mirror 50. For example, first electrode layer 106 may be a platinum (Pt) layer.

Figure 15:
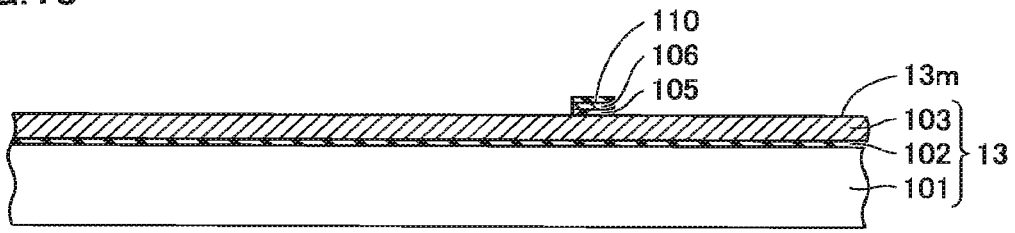
FIG. 15 is a partially enlarged plan view schematically illustrating a process next to the process illustrated in FIG. 13 in the method for manufacturing the scanning mirror and the attitude detector included in the optical scanning apparatus according to the first embodiment of the present invention.
Figure 16:
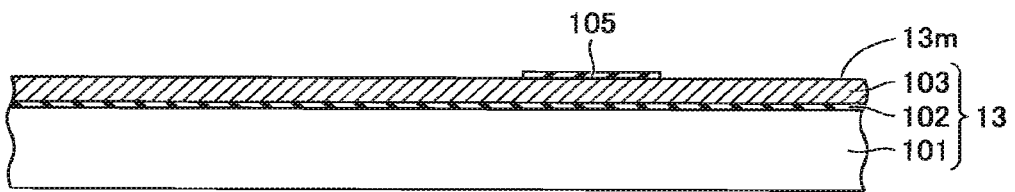
FIG. 16 is a partially enlarged plan view schematically illustrating a process next to the process illustrated in FIG. 14 in the method for manufacturing the scanning mirror and the attitude detector included in the optical scanning apparatus according to the first embodiment of the present invention.

As illustrated in FIG. 15, the method for manufacturing scanning mirror 15 and attitude detector 18 of the first embodiment includes forming piezoelectric layer 110 on first electrode layer 106. As illustrated in FIG. 16, piezoelectric layer 110 is not formed on second insulating layer 105 included in reflection mirror 50. For example, piezoelectric layer 110 may be made of a piezoelectric material such as lead zirconate titanate (PZT).

Figure 17:
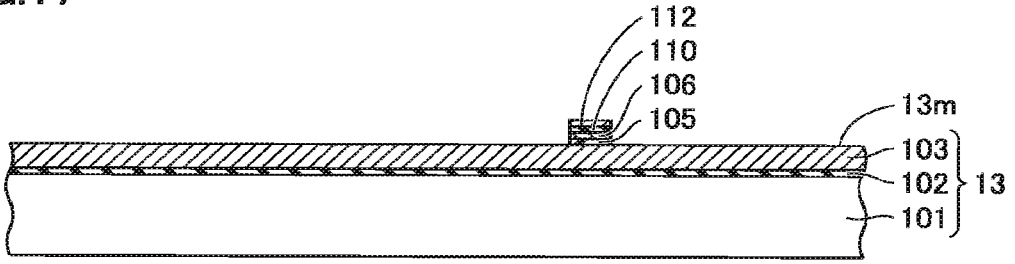
FIG. 17 is a partially enlarged plan view schematically illustrating a process next to the process illustrated in FIG. 15 in the method for manufacturing the scanning mirror and the attitude detector included in the optical scanning apparatus according to the first embodiment of the present invention.
Figure 18:
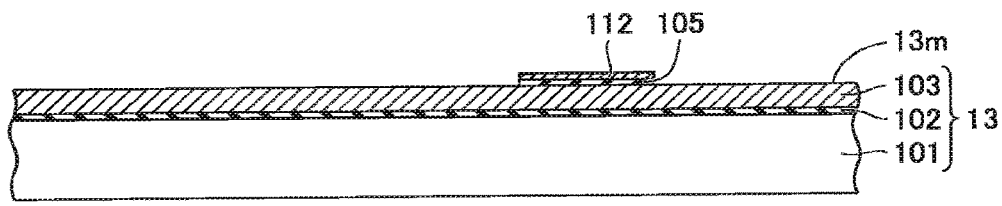
FIG. 18 is a partially enlarged plan view schematically illustrating a process next to the process illustrated in FIG. 16 in the method for manufacturing the scanning mirror and the attitude detector included in the optical scanning apparatus according to the first embodiment of the present invention.

As illustrated in FIGS. 17 and 18, the method for manufacturing scanning mirror 15 and attitude detector 18 of the first embodiment includes forming patterned gold layer 112 on piezoelectric layer 110 and second insulating layer 105 included in reflection mirror 50. Gold layer 112 included in first beams 51, 52, 53 corresponds to second electrode layer (112). Gold layer 112 included in reflection mirror 50 corresponds to reflection film (112).

Figure 19:
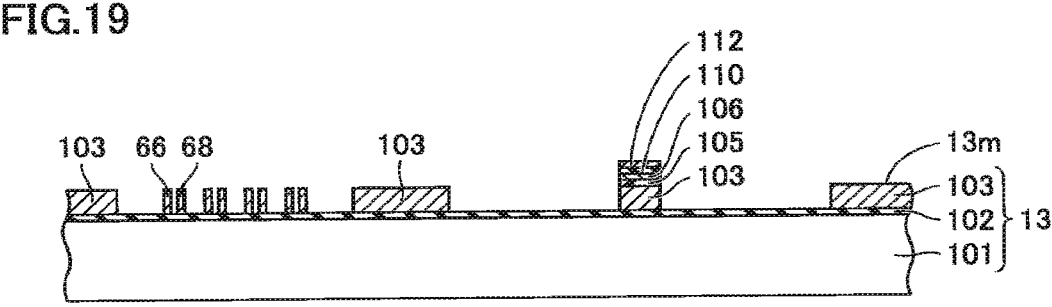
FIG. 19 is a partially enlarged plan view schematically illustrating a process next to the process illustrated in FIG. 17 in the method for manufacturing the scanning mirror and the attitude detector included in the optical scanning apparatus according to the first embodiment of the present invention.
Figure 20:
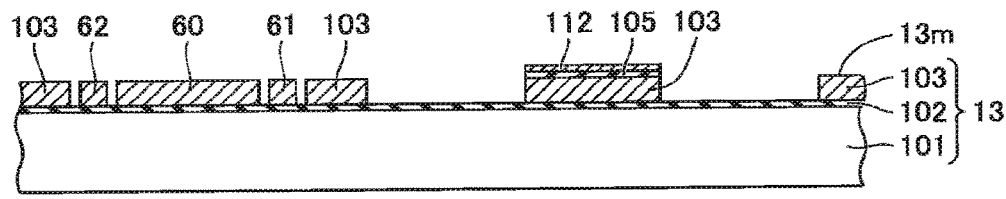
FIG. 20 is a partially enlarged plan view schematically illustrating a process next to the process illustrated in FIG. 18 in the method for manufacturing the scanning mirror and the attitude detector included in the optical scanning apparatus according to the first embodiment of the present invention.
Figure 21:
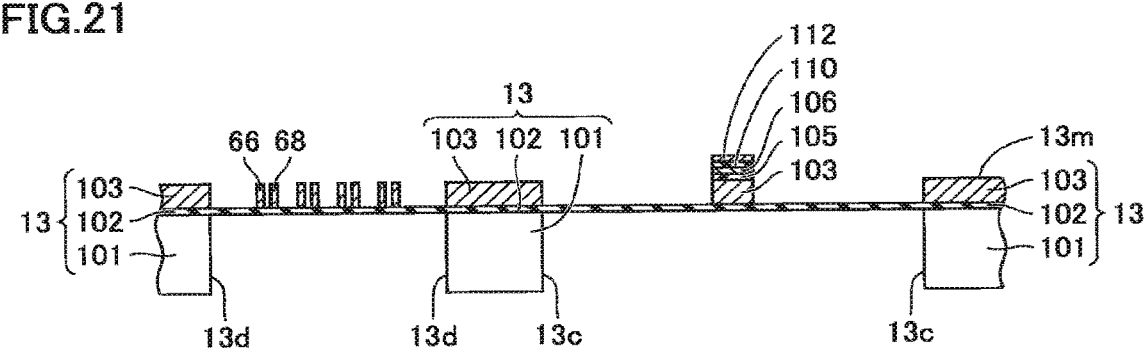
FIG. 21 is a partially enlarged plan view schematically illustrating a process next to the process illustrated in FIG. 19 in the method for manufacturing the scanning mirror and the attitude detector included in the optical scanning apparatus according to the first embodiment of the present invention.
Figure 22:
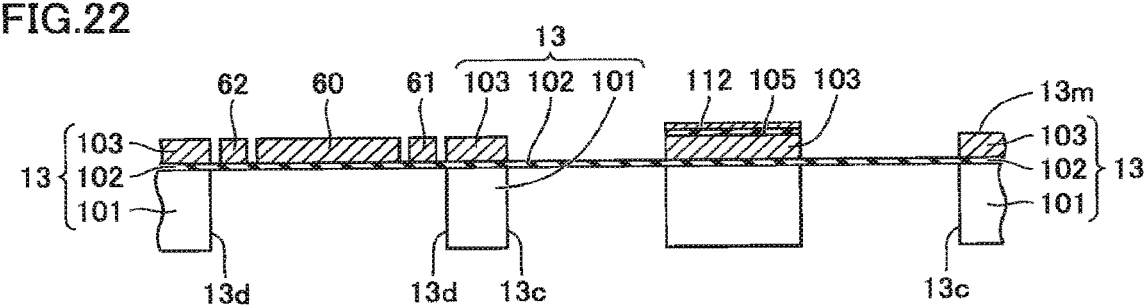
FIG. 22 is a partially enlarged plan view schematically illustrating a process next to the process illustrated in FIG. 20 in the method for manufacturing the scanning mirror and the attitude detector included in the optical scanning apparatus according to the first embodiment of the present invention.

As illustrated in FIGS. 19 and 20, the method for manufacturing scanning mirror 15 and attitude detector 18 of the first embodiment includes patterning first conductive semiconductor layer 103. Specifically, first conductive semiconductor layer 103 may be patterned by etching a part of first conductive semiconductor layer 103. As illustrated in FIGS. 21 and 22, the method for manufacturing scanning mirror 15 and attitude detector 18 of the first embodiment includes patterning nonconductive substrate 101. Specifically, nonconductive substrate 101 may be patterned by etching a part of nonconductive substrate 101. Finally, the method for manufacturing scanning mirror 15 and attitude detector 18 of the first embodiment includes patterning first insulating layer 102. Specifically, first insulating layer 102 may be patterned by etching a part of first insulating layer 102. Thus, scanning mirror 15 and attitude detector 18 illustrated in FIGS. 5 to 8 are manufactured.

Figure 3:
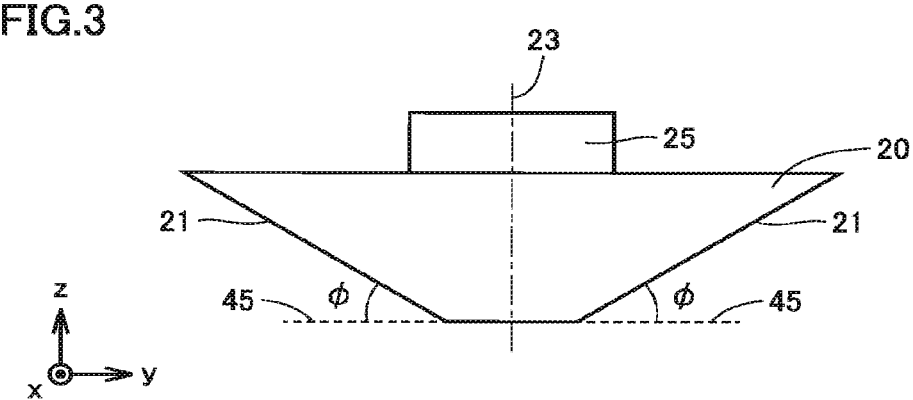
FIG. 3 is a partially enlarged side view schematically illustrating a reflection member and a first drive unit included in the optical scanning apparatus according to the first embodiment of the present invention.
Figure 4:
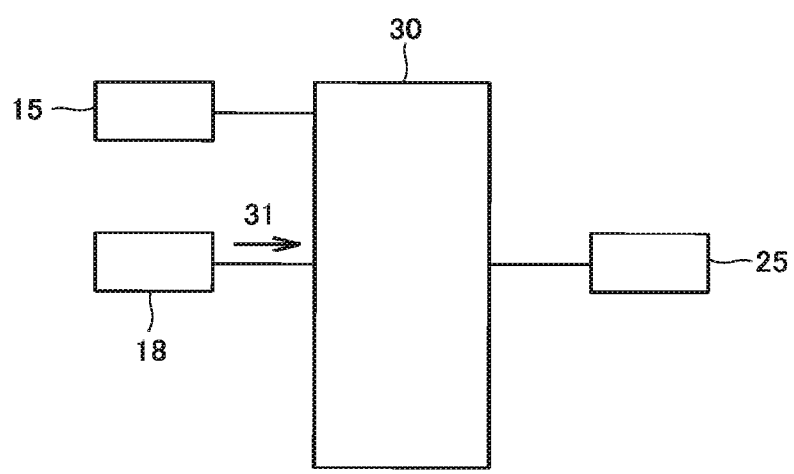
FIG. 4 is a control block diagram illustrating the optical scanning apparatus according to the first embodiment of the present invention.

As illustrated in FIGS. 1, 3, and 23, reflection member 20 is configured to reflect light beam 11 reflected by scanning mirror 15. Reflection member 20 is rotatably attached to first drive unit 25. A center axis 23 of reflection member 20 may be coaxial with optical axis 12 of light beam 11 emitted from light source 10. Reflection member 20 includes a reflection surface 21. Reflection surface 21 is inclined at an inclination angle $\varphi$ with respect to horizontal surface 45. For example, reflection member 20 may have a truncated cone shape, and reflection surface 21 may be formed on a side surface of the truncated cone. For example, light beam 11 reflected by reflection member 20 is emitted from optical scanning apparatus 1 along the horizontal surface 45. When the angle between light beam 11 incident on scanning mirror 15 (reflection mirror 50) and light beam 11 reflected by reflection surface 21 is 90 degrees, the incident angle $\theta$ and the inclination angle $\varphi$ have a relationship given by the following equation (1).

$$2\theta + 2\varphi = 90° \quad (1)$$

First drive unit 25 is configured to adjust the inclination of reflection member 20 with respect to main surface 13m of substrate 13. First drive unit 25 is configured to adjust the inclination of reflection member 20 with respect to light beam 11 reflected by scanning mirror 15. Specifically, first drive unit 25 adjusts the inclination of reflection member 20 with respect to main surface 13m of substrate 13 according to the attitude angle of substrate 13 or the attitude angle of optical scanning apparatus 1 that is detected by attitude detector 18. First drive unit 25 can adjust the inclination of reflection member 20 with respect to main surface 13m of substrate 13 such that an outgoing angle of light beam 11 from optical scanning apparatus 1 with respect to horizontal surface 45 is maintained regardless of the inclination of the substrate 13 with respect to the horizontal surface 45. More specifically, first drive unit 25 can adjust the inclination of reflection member 20 with respect to main surface 13m of substrate 13 such that light beam 11 emitted from optical scanning apparatus 1 travels in parallel to the horizontal surface 45 regardless of the inclination of the substrate 13 with respect to the horizontal surface 45. First drive unit 25 can incline reflection member 20 about an axis (for example, a y-axis) along the second direction with one point on center axis 23 of reflection member 20 as the center. For example, first drive unit 25 may be a motor.

Controller 30 is configured to control first drive unit 25 based on first signal 31. Specifically, controller 30 receives first signal 31 output from attitude detector 18. In the first embodiment, first signal 31 includes a ratio $G_x/G$ of a component $G_x$ in the first direction of gravitational acceleration G to gravitational acceleration G. Controller 30 calculates a first angle ($\alpha$) that is the attitude angle of substrate 13 from first signal 31. Controller 30 calculates a second angle ($-\alpha/2$) that is an angle by which reflection member 20 is inclined from the first angle ($\alpha$). Controller 30 may further control action of scanning mirror 15 (reflection mirror 50). Specifically, controller 30 may control the voltage applied between first electrode layer 106 and second electrode layer (112) of first beams 51, 52, 53 supporting reflection mirror 50.

Casing 28 accommodates light source 10, substrate 13, reflection member 20, and first drive unit 25. Casing 28 may further accommodate controller 30. Substrate 13 and controller 30 may be fixed to a bottom surface of casing 28. First drive unit 25 may be fixed to a top surface of casing 28. Light source 10 may be fixed to casing 28.

With reference to FIG. 1, the action of optical scanning apparatus 1 when vehicle 5 in which optical scanning apparatus 1 is incorporated moves in traveling direction 7 at constant velocity on horizontal surface 45 or when vehicle 5 stands still on horizontal surface 45 will be described. Traveling direction 7 is parallel to the first direction (for example, the x-direction). Light beam 11 emitted from light source 10 is reflected by scanning mirror 15 and reflection member 20, and output from optical scanning apparatus 1. For example, light beam 11 emitted from optical scanning apparatus 1 travels in parallel to the horizontal surface 45. Scanning mirror 15 (reflection mirror 50) performs the swing motion about optical axis 12 of light beam 11 incident on scanning mirror 15 (reflection mirror 50) while an incident angle θ of light beam 11 with respect to scanning mirror 15 (reflection mirror 50) is maintained. Consequently, optical scanning apparatus 1 incorporated in vehicle 5 can scan the whole circumference in the horizontal direction with light beam 11.

Vehicle 5 in which optical scanning apparatus 1 is incorporated moves in travelling direction 7 at constant speed on horizontal surface 45, or vehicle 5 stands still on horizontal surface 45, whereby force along the first direction is not applied to inertial mass body 60 of attitude detector 18. Inertial mass body 60 is not displaced with respect to first fixed units 13f, 13g of substrate 13. Attitude detector 18 outputs first signal 31 to controller 30 according to the attitude angle of substrate 13 based on the capacitance formed between first movable interdigital electrodes 65, 66 and first fixed interdigital electrodes 67, 68. Controller 30 does not drive first drive unit 25.

With reference to FIG. 23, the action of optical scanning apparatus 1 when vehicle 5 in which optical scanning apparatus 1 is incorporated moves in traveling direction 7 at constant velocity on inclined surface 47 or when vehicle 5 stands still on inclined surface 47 will be described. In the first embodiment, inclined surface 47 is inclined with respect to horizontal surface 45 by an angle $\alpha$ in the first direction (for example, the x-direction) that is traveling direction 7 of vehicle 5. In the first embodiment, inclined surface 47 is not inclined in the second direction (for example, the y-direction) with respect to horizontal surface 45.

As illustrated in FIG. 24, vehicle 5 in which optical scanning apparatus 1 is incorporated moves in traveling direction 7 at constant velocity on inclined surface 47, or vehicle 5 stands still on inclined surface 47, whereby the force along the first direction (for example, the x-direction) acts on inertial mass body 60 of attitude detector 18. Specifically, acceleration acting on inertial mass body 60 along the first direction (for example, the x-direction) is provided by dividing the force by a mass of inertial mass body 60. The acceleration acting on inertial mass body 60 along the first direction (for example, the x-direction) is equal to component (for example, an x-component) $G_x$ in the first direction of gravitational acceleration G.

Inertial mass body 60 is displaced along the first direction (for example, the x-direction) with respect to first fixed units 13f, 13g of substrate 13 by the force acting on inertial mass body 60, and the capacitance formed between first movable interdigital electrodes 65, 66 and first fixed interdigital electrodes 67, 68 changes. Attitude detector 18 outputs first signal 31 corresponding to the attitude angle of substrate 13 to controller 30 based on the changed capacitance. In the first embodiment, first signal 31 includes a ratio $G_x/G$ of a component $G_x$ in the first direction of gravitational acceleration G to gravitational acceleration G.

Controller 30 calculates a first angle ($\alpha$) that is the attitude angle of substrate 13 from first signal 31. Specifically, controller 30 may calculate the first angle ($\alpha$) that is the attitude angle of substrate 13 from an arcsine function of first signal 31. The first angle ($\alpha$) may be given by the following equation (2).

$$\alpha = \sin^{-1}(G_x/G) \qquad (2)$$

Controller 30 calculates a second angle ($-\alpha/2$) from the first angle ($\alpha$). The second angle ($-\alpha/2$) is $-0.5$ times the first angle ($\alpha$). Controller 30 controls first drive unit 25 to incline reflection member 20 by the second angle ($-\alpha/2$) about an axis (for example, a y-axis) along the second direction. An absolute value of the second angle ($-\alpha/2$) is a half of an absolute value of the first angle ($\alpha$), and the direction in which reflection member 20 is inclined is opposite to the inclination direction of substrate 13 (or the inclination direction of optical scanning apparatus 1) In this manner, even if vehicle 5 in which optical scanning apparatus 1 is incorporated moves in traveling direction 7 at constant velocity on inclined surface 47, or even if vehicle 5 stands still on inclined surface 47, the outgoing angle of light beam 11 from optical scanning apparatus 1 with respect to horizontal surface 45 can be maintained regardless of the inclination of optical scanning apparatus 1 with respect to horizontal surface 45. Specifically, light beam 11 is output from optical scanning apparatus 1 in the horizontal direction regardless of the inclination of optical scanning apparatus 1 with respect to horizontal surface 45.

Figure 25:
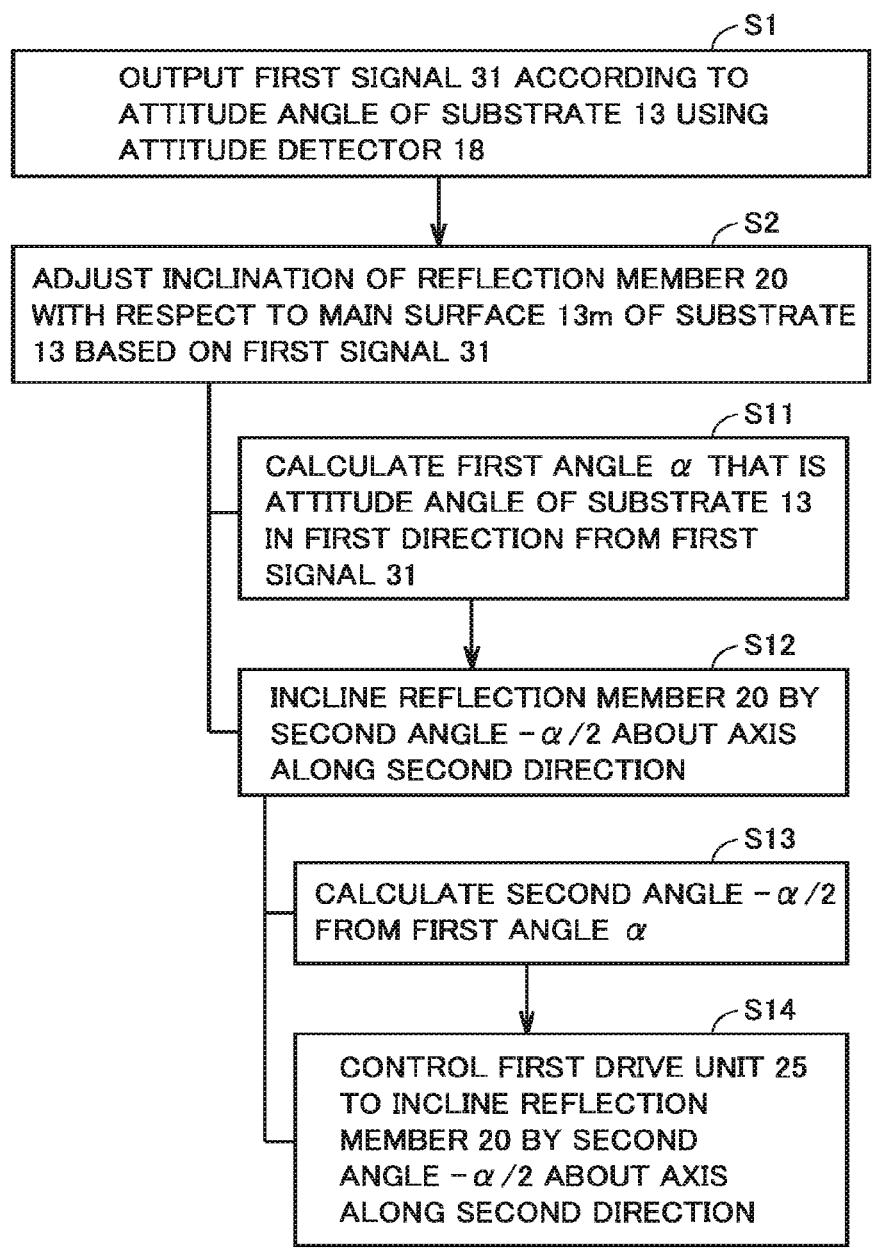
FIG. 25 is a view illustrating a flowchart of a method for controlling the optical scanning apparatus according to the first embodiment of the present invention.

With reference to FIG. 25, a method for controlling optical scanning apparatus 1 of the first embodiment will be described.

The method for controlling optical scanning apparatus 1 of the first embodiment includes outputting first signal 31 according to the attitude angle of substrate 13 using attitude detector 18 (S1). Specifically, attitude detector 18 may output first signal 31 according to the attitude angle of substrate 13 in one direction (for example, the x-direction) in main surface 13m of substrate 13. In the first embodiment, first signal 31 includes a ratio $G_x/G$ of a component $G_x$ in the first direction of gravitational acceleration G to gravitational acceleration G.

The method for controlling optical scanning apparatus 1 of the first embodiment further includes adjusting the inclination of reflection member 20 with respect to main surface 13m of substrate 13 based on first signal 31 (S2). Specifically, in the method for controlling optical scanning apparatus 1 of the first embodiment, adjusting the inclination of reflection member 20 (S2) may include calculating the first angle ($\alpha$) that is the attitude angle of substrate 13 from first signal 31 (S11) and inclining reflection member 20 by the second angle ($-\alpha/2$) about the axis (for example, the y-axis) along the second direction (S12).

Calculating the first angle ($\alpha$) that is the attitude angle of substrate 13 from first signal 31 (S11) may be calculating the first angle ($\alpha$) that is the attitude angle of substrate 13 from the arcsine function of first signal 31. The first angle ($\alpha$) may be given by the equation (2). Inclining reflection member 20 by the second angle ($-\alpha/2$) (S12) may include calculating the second angle ($-\alpha/2$) from the first angle ($\alpha$) (S13) and controlling first drive unit 25 to incline reflection member 20 by the second angle ($-\alpha/2$) about the axis (for example, the y-axis) along the second direction (S14). The second angle ($-\alpha/2$) may be $-0.5$ times the first angle ($\alpha$). An absolute value of the second angle ($-\alpha/2$) is a half of an absolute value of the first angle ($\alpha$), and the direction in which reflection member 20 is inclined is opposite to the inclination direction of substrate 13 (or the inclination direction of optical scanning apparatus 1)

Figure 26:
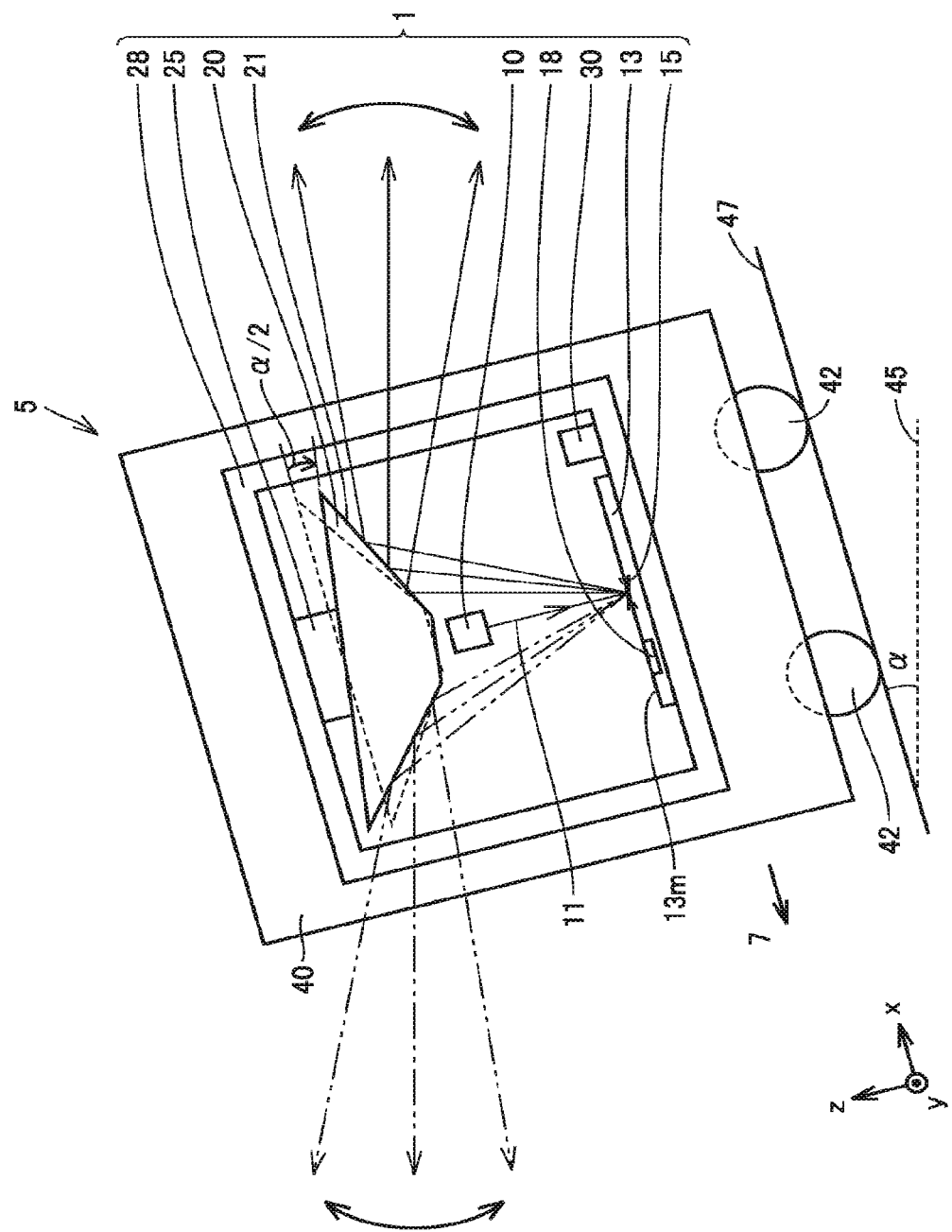
FIG. 26 is a side view schematically illustrating an optical scanning apparatus according to a first modification of the first embodiment of the present invention.

In optical scanning apparatus 1 according to a first modification of the present embodiment, as illustrated in FIG. 26, scanning mirror 15 may perform the swing motion about optical axis 12 of light beam 11 incident on scanning mirror 15 while the incident angle θ of light beam 11 with respect to scanning mirror 15 is maintained. That is, scanning mirror 15 (reflection mirror 50) may be rotated about optical axis 12 of light beam 11 incident on scanning mirror 15 with the center of scanning mirror 15 (reflection mirror 50) as the center while being inclined at the incident angle θ with respect to light beam 11 incident on scanning mirror 15 (reflection mirror 50). Optical scanning apparatus 1 can scan not only the whole circumference in the horizontal direction but also in the third direction (for example, the z-direction).

Figure 27:
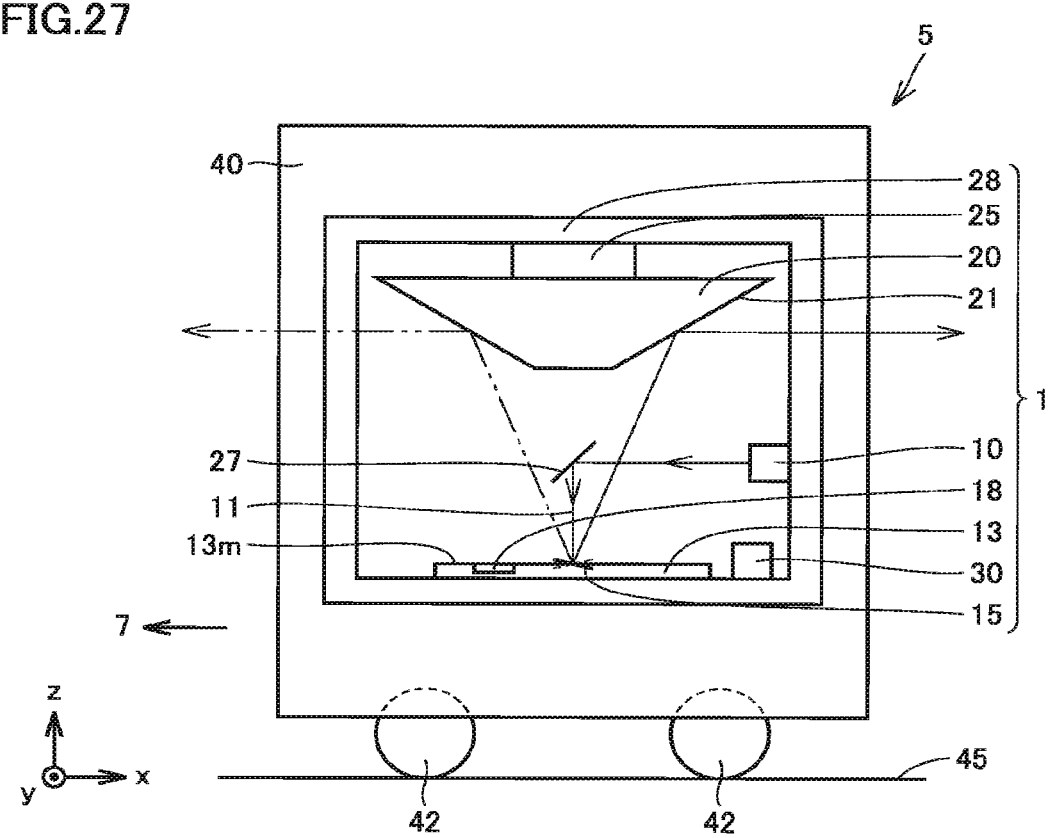
FIG. 27 is a side view schematically illustrating an optical scanning apparatus according to a second modification of the first embodiment of the present invention.
Figure 28:
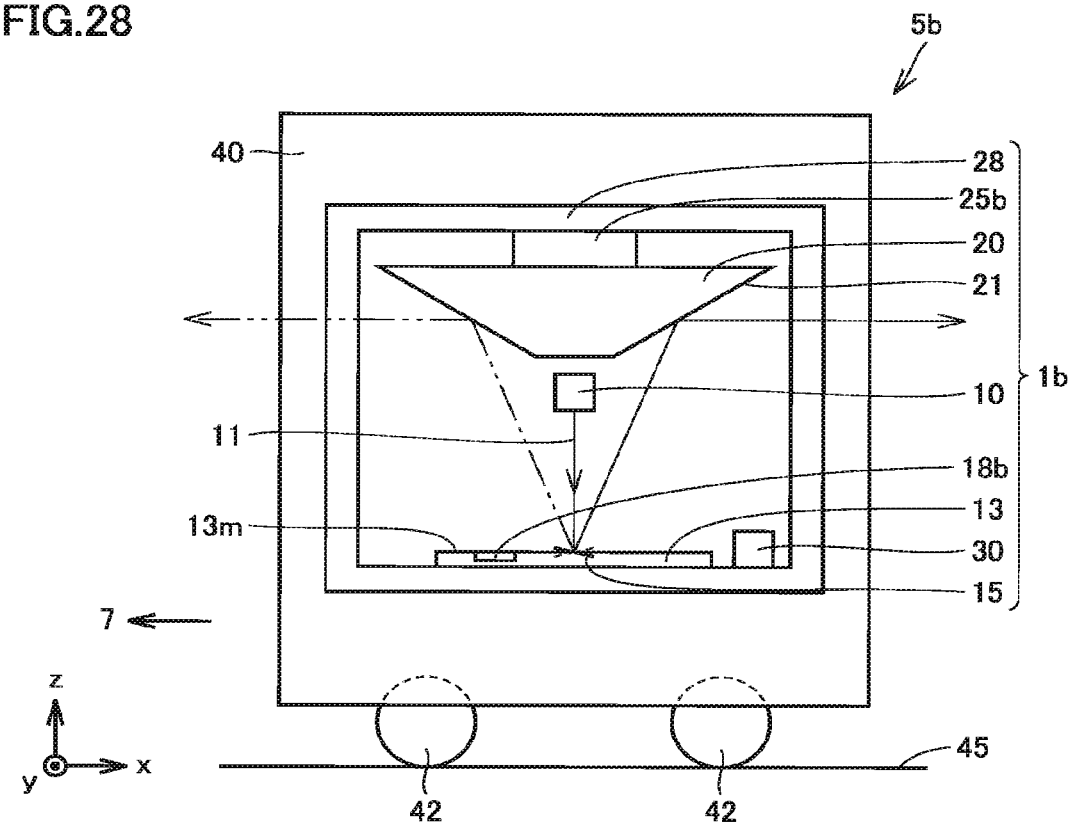
FIG. 28 is a side view schematically illustrating an optical scanning apparatus according to a second embodiment of the present invention.

As illustrated in FIG. 27, optical scanning apparatus 1 according to a second modification of the first embodiment may further include a fixed mirror 27. Light source 10 is fixed to the side surface of casing 28. Fixed mirror 27 is fixed to casing 28. Fixed mirror 27 reflects light beam 11 emitted from light source 10, and causes light beam 11 to enter scanning mirror 15.

The advantageous effects of optical scanning apparatus 1 of the first embodiment, the method for controlling optical scanning apparatus 1, and vehicle 5 will be described.

Optical scanning apparatus 1 of the first embodiment includes light source 10 and substrate 13. Scanning mirror 15 and attitude detector 18 are integrated with substrate 13. Scanning mirror 15 is configured to reflect light beam 11 emitted from light source 10 and perform scanning with light beam 11. Scanning mirror 15 is provided on main surface 13m of substrate 13. Attitude detector 18 is configured to output a first signal 31 according to an attitude angle of substrate 13. Optical scanning apparatus 1 of the first embodiment further includes reflection member 20, the drive unit (first drive unit 25), and controller 30. Reflection member 20 is configured to reflect light beam 11 reflected by scanning mirror 15. The drive unit (first drive unit 25) is configured to adjust the inclination of reflection member 20 with respect to main surface 13m of substrate 13. Controller 30 is configured to control the drive unit (first drive unit 25) based on first signal 31.

In optical scanning apparatus 1 of the first embodiment, the inclination of reflection member 20 with respect to main surface 13m of substrate 13 can be adjusted based on first signal 31 output from attitude detector 18 according to the attitude angle of substrate 13. Because scanning mirror 15 and attitude detector 18 are integrated with substrate 13, the position and inclination of attitude detector 18 with respect to the optical system of optical scanning apparatus 1 including scanning mirror 15 are substantially unchanged. For example, even if the position or inclination of a member except for the optical system of optical scanning apparatus 1 with respect to the optical system of optical scanning apparatus 1 changes while optical scanning apparatus 1 is used for a long period of time, the position and inclination of attitude detector 18 with respect to the optical system of the optical scanning apparatus 1 are substantially unchanged For this reason, attitude detector 18 can stably and accurately detect the attitude of the optical system of optical scanning apparatus 1 with respect to horizontal surface 45. In optical scanning apparatus 1 of the first embodiment, the outgoing angle of light beam 11 from optical scanning apparatus 1 with respect to horizontal surface 45 can stably be maintained regardless of the inclination of optical scanning apparatus 1 with respect to horizontal surface 45.

In optical scanning apparatus 1 of the first embodiment, attitude detector 18 may include either the acceleration sensor or the inclinometer. In optical scanning apparatus 1 of the first embodiment, the outgoing angle of light beam 11 from optical scanning apparatus 1 with respect to horizontal surface 45 can stably be maintained regardless of the inclination of optical scanning apparatus 1 with respect to horizontal surface 45.

In optical scanning apparatus 1 of the first embodiment, attitude detector 18 may include the MEMS acceleration sensor. In optical scanning apparatus 1 of the first embodiment, the outgoing angle of light beam 11 from optical scanning apparatus 1 with respect to horizontal surface 45 can stably be maintained regardless of the inclination of optical scanning apparatus 1 with respect to horizontal surface 45. Because the MEMS acceleration sensor is a compact acceleration sensor, the MEMS acceleration sensor can easily be integrated with substrate 13, and optical scanning apparatus can be downsized.

In optical scanning apparatus 1 of the first embodiment, attitude detector 18 may be configured to output first signal 31 according to the attitude angle of substrate 13 in one direction (first direction (for example, the x-direction)) in main surface 13m of substrate 13. In optical scanning apparatus 1 of the first embodiment, the outgoing angle of light beam 11 from optical scanning apparatus 1 with respect to horizontal surface 45 can stably be maintained regardless of the inclination of optical scanning apparatus 1 with respect to horizontal surface 45 in one direction (for example, the x-direction) in main surface 13m of substrate 13.

In optical scanning apparatus 1 of the first embodiment, scanning mirror 15 may be the two-dimensional scanning mirror. Optical scanning apparatus 1 of the first embodiment can scan the whole circumference in the horizontal direction with light beam 11.

In optical scanning apparatus 1 of the first embodiment, scanning mirror 15 may be configured to perform the swing motion about optical axis 12 of light beam 11 incident on scanning mirror 15 while the incident angle θ of light beam 11 with respect to scanning mirror 15 is maintained. Optical scanning apparatus 1 of the first embodiment can scan the whole circumference in the horizontal direction with light beam 11.

In optical scanning apparatus 1 of the first embodiment, scanning mirror 15 may be configured to perform the swing motion about optical axis 12 of light beam 11 incident on scanning mirror 15 while the incident angle θ of light beam 11 with respect to scanning mirror 15 changes. Optical scanning apparatus 1 of the first embodiment can scan not only the whole circumference in the horizontal direction but also the circumference in the vertical direction (third direction (for example, the z-direction)) with light beam 11.

Vehicle 5 of the first embodiment includes optical scanning apparatus 1. In vehicle 5 of the first embodiment, the inclination of reflection member 20 with respect to main surface 13m of substrate 13 can be adjusted based on first signal 31 output from attitude detector 18 according to the attitude angle of substrate 13. Because scanning mirror 15 and attitude detector 18 are integrated with substrate 13, the position and inclination of attitude detector 18 with respect to the optical system of optical scanning apparatus 1 including scanning mirror 15 are substantially unchanged. For this reason, attitude detector 18 can stably and accurately detect the attitude of the optical system of optical scanning apparatus 1 with respect to horizontal surface 45. In vehicle 5 of the first embodiment, the outgoing angle of light beam 11 from optical scanning apparatus 1 with respect to horizontal surface 45 can stably be maintained even if vehicle 5 into which optical scanning apparatus 1 is incorporated moves on inclined surface 47.

In the method for controlling optical scanning apparatus 1 of the first embodiment, optical scanning apparatus 1 includes light source 10, substrate 13, and reflection member 20. Scanning mirror 15 and attitude detector 18 are integrated with substrate 13. Scanning mirror 15 reflects light beam 11 emitted from the light source 10, and performs the scanning with light beam 11. Scanning mirror 15 is provided on main surface 13m of substrate 13. Reflection member 20 reflects light beam 11 reflected by scanning mirror 15. The method for controlling optical scanning apparatus 1 includes outputting first signal 31 according to the attitude angle of substrate 13 using attitude detector 18 (S1) and adjusting the inclination of reflection member 20 with respect to main surface 13m of substrate 13 based on first signal 31 (S2).

In the method for controlling optical scanning apparatus 1 of the first embodiment, the inclination of reflection member 20 with respect to main surface 13m of substrate 13 can be adjusted based on first signal 31 output from attitude detector 18 according to the attitude angle of substrate 13. Because scanning mirror 15 and attitude detector 18 are integrated with substrate 13, the position and inclination of attitude detector 18 with respect to the optical system of optical scanning apparatus 1 including scanning mirror 15 are substantially unchanged. For this reason, attitude detector 18 can stably and accurately detect the attitude of the optical system of optical scanning apparatus 1 with respect to horizontal surface 45. In the method for controlling optical scanning apparatus 1 of the first embodiment, the outgoing angle of light beam 11 from optical scanning apparatus 1 with respect to horizontal surface 45 can stably be maintained regardless of the inclination of optical scanning apparatus 1 with respect to horizontal surface 45.

In the method for controlling optical scanning apparatus 1 of the first embodiment, attitude detector 18 may be configured to output first signal 31 according to the attitude angle of substrate 13 in one direction (first direction (for example, the x-direction)) in main surface 13m of substrate 13. In the method for controlling optical scanning apparatus 1 of the first embodiment, the outgoing angle of light beam 11 from optical scanning apparatus 1 with respect to horizontal surface 45 can stably be maintained regardless of the inclination of optical scanning apparatus 1 with respect to horizontal surface 45 in one direction (for example, the x-direction) in main surface 13m of substrate 13.

In the method for controlling optical scanning apparatus 1 of the first embodiment, adjusting the inclination of reflection member 20 (S2) may include calculating the first angle (α) that is the attitude angle of substrate 13 from the arcsine function of first signal 31 (S11) and inclining reflection member 20 by the second angle (−α/2) (S12). The second angle (−α/2) may be −0.5 times the first angle (α). In the method for controlling optical scanning apparatus 1 of the first embodiment, the outgoing angle of light beam 11 from optical scanning apparatus 1 with respect to horizontal surface 45 can stably be maintained regardless of the inclination of optical scanning apparatus 1 with respect to horizontal surface 45.

Second Embodiment

With reference to FIGS. 28 to 34, an optical scanning apparatus 1b and a vehicle 5b according to a second embodiment will be described. Optical scanning apparatus 1b and vehicle 5b of the second embodiment have the same configurations as optical scanning apparatus 1 and vehicle 5 of the first embodiment, but differ mainly from optical scanning apparatus 1 and vehicle 5 in the following points.

In optical scanning apparatus 1b and vehicle 5b of the second embodiment, an attitude detector 18b is configured to output a first signal 31b according to the attitude angle of substrate 13 in two directions intersecting with each other in main surface 13m of substrate 13. The two directions are the first direction (for example, the x-direction) and the second direction (for example, the y-direction). When vehicle 5b into which optical scanning apparatus 1b is incorporated moves on horizontal surface 45, for example, the first direction (for example, the x-direction) may be a traveling direction 7 of vehicle 5, and the second direction (for example, the y-direction) may be a width direction of vehicle 5 orthogonal to the traveling direction 7 of vehicle 5 and the gravity direction.

Figure 29:
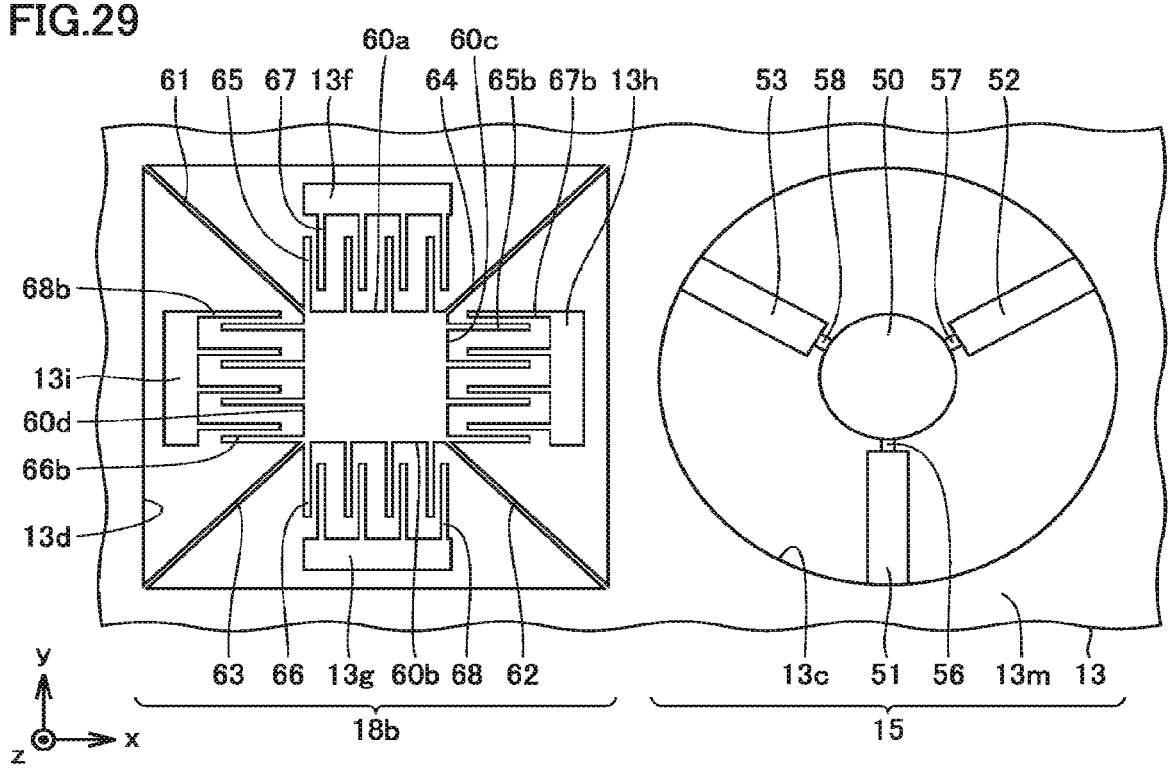
FIG. 29 is a partially enlarged plan view schematically illustrating a scanning mirror and an attitude detector included in the optical scanning apparatus according to the second embodiment of the present invention.
Figure 30:
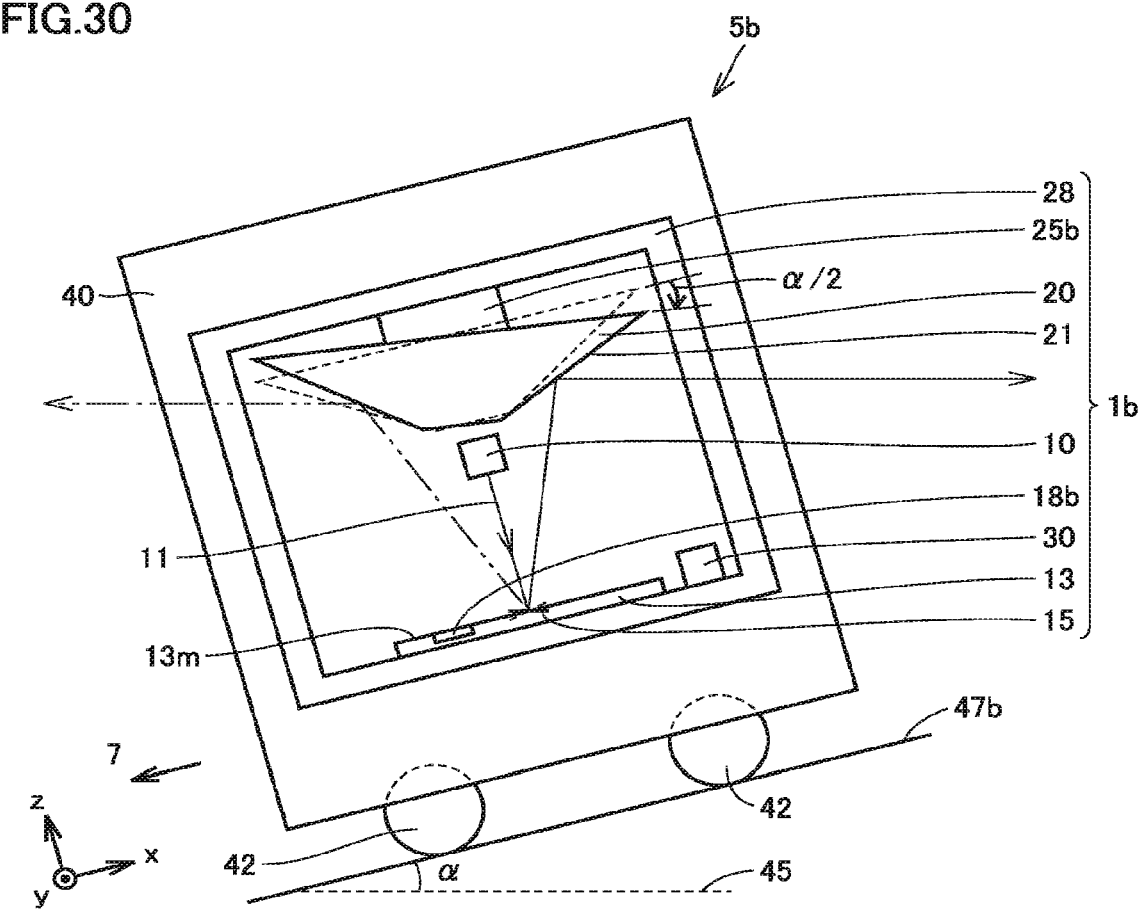
FIG. 30 is a side view schematically illustrating the optical scanning apparatus according to the second embodiment of the present invention.

As illustrated in FIG. 29, attitude detector 18b of the second embodiment may be a micro-electro-mechanical system (MEMS) acceleration sensor. Attitude detector 18b includes inertial mass body 60, second beams 61, 62, 63, 64 that are connected to substrate 13 while supporting inertial mass body 60, first movable interdigital electrodes 65, 66 connected to inertial mass body 60, second movable interdigital electrodes 65b, 66b connected to inertial mass body 60, first fixed interdigital electrodes 67, 68 that are respectively connected to first fixed units 13f, 13g of substrate 13 while provided in second opening 13d, and second interdigital electrodes 67b, 68b that are respectively connected to second fixed units 13h, 13i of substrate 13 while provided in second opening 13d.

Inertial mass body 60 and first movable interdigital electrodes 65, 66 of the second embodiment have the same configurations as inertial mass body 60 and first movable interdigital electrodes 65, 66 of the first embodiment. First fixed units 13f, 13g and first fixed interdigital electrodes 67, 68 of the second embodiment have the same configurations as first fixed units 13f, 13g and first fixed interdigital electrode 67, 68 of the first embodiment.

Second beams 61, 62, 63, 64 may include first conductive semiconductor layer 103. Second beams 61, 62, 63, 64 may be configured such that inertial mass body 60 can be displaced in the first direction (for example, the x-direction) and the second direction (for example, the y-direction). Second beams 61, 62, 63, 64 connect the substrate 13 and corners of inertial mass body 60. Second movable interdigital electrodes 65b, 66b may include first conductive semiconductor layer 103 (see FIG. 6). Second movable interdigital electrode 65b may extend in the first direction (for example, the x-direction) from third side surface 60c of inertial mass body 60. Second movable interdigital electrode 65b is separated from second fixed unit 13h of substrate 13 in the first direction (for example, the x-direction). Second movable interdigital electrode 66b may extend in the first direction (for example, the x-direction) from fourth side surface 60d of inertial mass body 60. Second movable interdigital electrode 66b is separated from second fixed unit 13i of substrate 13 in the first direction (for example, the x-direction).

In planar view of main surface 13m of substrate 13, inertial mass body 60 is disposed between second fixed units 13h, 13i. Second fixed unit 13h, inertial mass body 60, and second fixed unit 13i are disposed in this order in the first direction (for example, the x-direction). Second fixed units 13h, 13i may include nonconductive substrate 101, first insulating layer 102 provided on nonconductive substrate 101, and first conductive semiconductor layer 103 provided on first insulating layer 102.

Second fixed interdigital electrodes 67b, 68b may include first conductive semiconductor layer 103 (see FIG. 6). Second fixed interdigital electrode 67b may extend in the first direction (for example, the x-direction) from second fixed unit 13h. Second fixed interdigital electrode 67b is separated from inertial mass body 60 in the first direction (for example, the x-direction). Second fixed unit 13h and second fixed interdigital electrode 67b face third side surface 60c of inertial mass body 60. Second fixed interdigital electrode 68b may extend in the first direction (for example, the x-direction) from second fixed unit 13i. Second fixed interdigital electrode 68b is separated from inertial mass body 60 in the second direction (for example, the y-direction). Second fixed unit 13i and second fixed interdigital electrode 68b face fourth side surface 60d of inertial mass body 60.

Second fixed interdigital electrode 67b is separated from second movable interdigital electrode 65b in the second direction (for example, the y-direction). Second movable interdigital electrode 65b and second fixed interdigital electrode 67b may be disposed so as to overlap each other when viewed from the second direction (for example, the y-direction). The capacitance is formed between second movable interdigital electrode 65b and second fixed interdigital electrode 67b. Second fixed interdigital electrode 68b is separated from second movable interdigital electrode 66b in the second direction (for example, the y-direction). Second movable interdigital electrode 66b and second fixed interdigital electrode 68b may be disposed so as to overlap each other when viewed from the second direction (for example, the y-direction). The capacitance is formed between second movable interdigital electrode 66b and second fixed interdigital electrode 68b.

Figure 32:
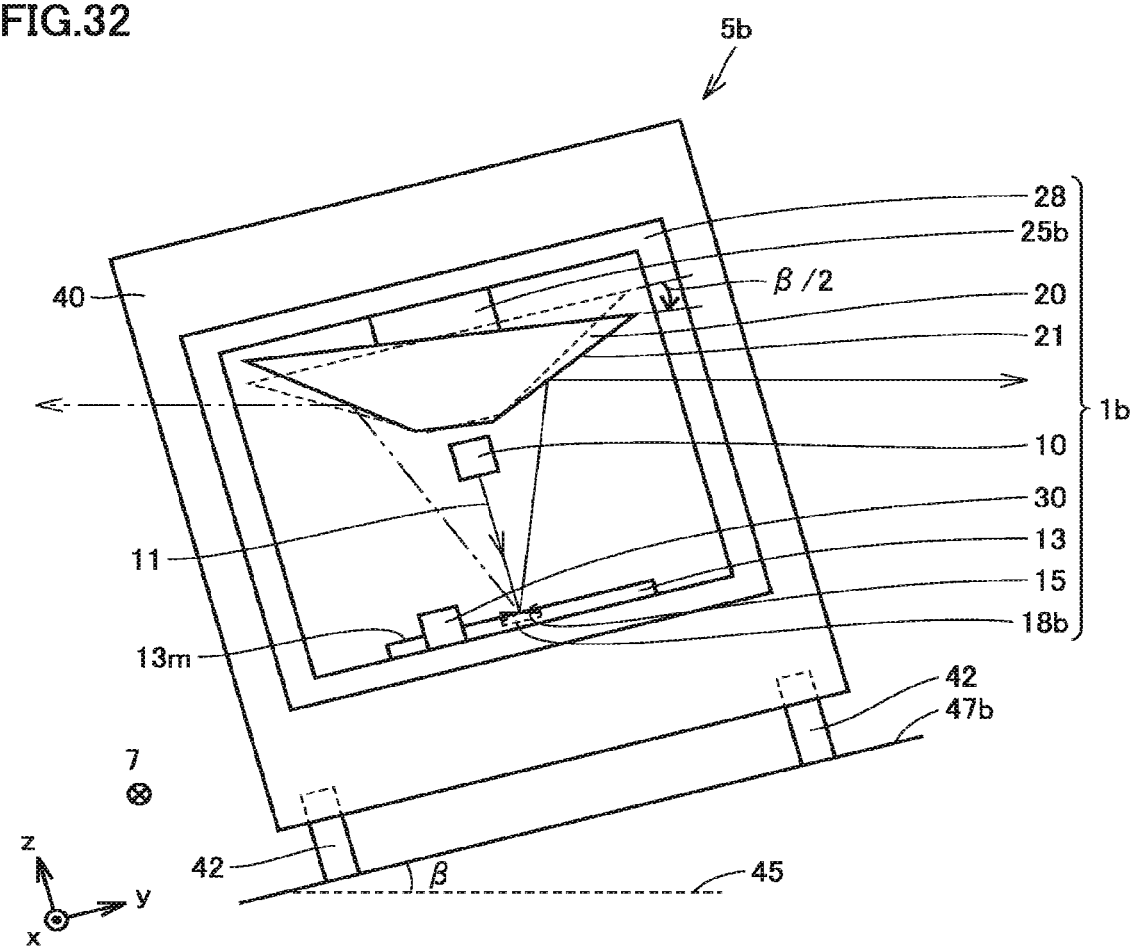
FIG. 32 is a rear view schematically illustrating the optical scanning apparatus according to the second embodiment of the present invention.
Figure 33:
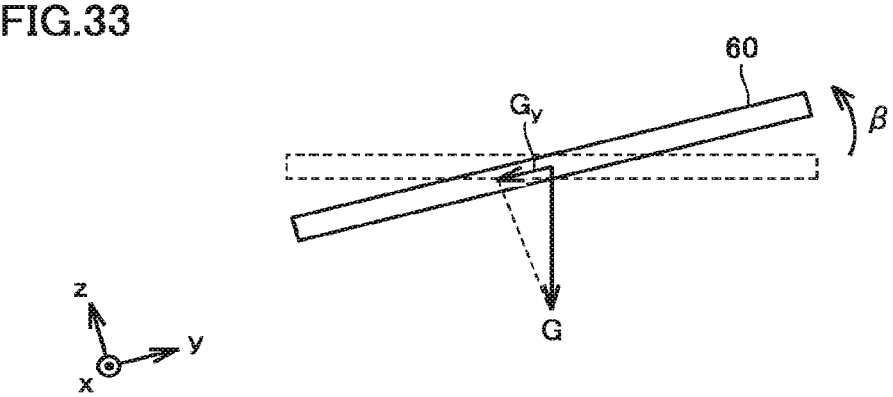
FIG. 33 is a partially enlarged rear view schematically illustrating the attitude detector included in the optical scanning apparatus according to the second embodiment of the present invention.
Figure 34:
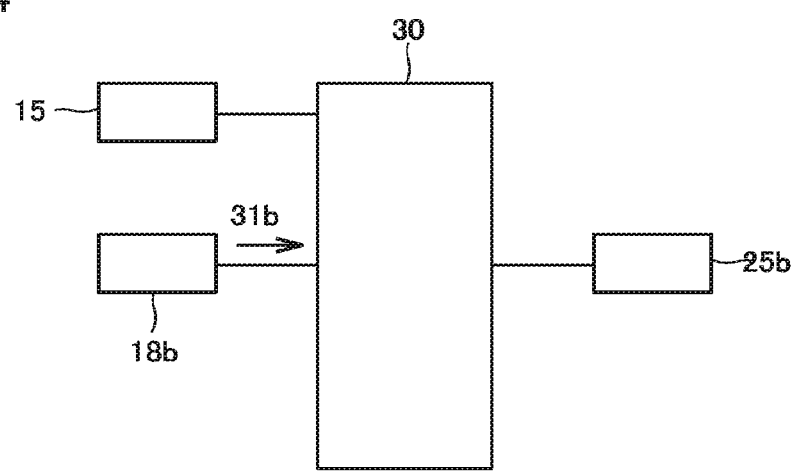
FIG. 34 is a control block diagram illustrating the optical scanning apparatus according to the second embodiment of the present invention.

In attitude detector 18b of the second embodiment is, similarly to attitude detector 18 of the first embodiment, the inclination angle ($\alpha$) of substrate 13 with respect to horizontal surface 45 in the first direction (for example, the x-direction) can be detected as the change in capacitance formed between first movable interdigital electrodes 65, 66 and first fixed interdigital electrodes 67, 68. As will be described in detail later, as illustrated in FIGS. 32 and 33, the gap between second movable interdigital electrodes 65b, 66b and second fixed interdigital electrode 67b, 68b changes according to the inclination angle ($\beta$) of substrate 13 with respect to horizontal surface 45 in the second direction (for example, the y-direction). The inclination angle ($\beta$) of substrate 13 with respect to horizontal surface 45 in the second direction (for example, the y-direction) is detected as the change in capacitance formed between second movable interdigital electrodes 65b, 66b and second fixed interdigital electrodes 67b, 68b.

A first drive unit 25b of the second embodiment is similar to first drive unit 25 of the first embodiment, but differs from first drive unit 25 in the following points. First drive unit 25b can incline reflection member 20 about not only the axis (for example, the x-axis) along the first direction but also the axis (for example, the y-axis) along the second direction, with one point on center axis 23 of reflection member 20 as the center.

Controller 30 is configured to control first drive unit 25b based on first signal 31b. Specifically, controller 30 receives first signal 31b output from attitude detector 18b. In the second embodiment, first signal 31b includes a first subsignal indicating ratio $G_x/G$ of component $G_x$ in the first direction of gravitational acceleration G to gravitational acceleration G and a second sub-signal indicating a ratio $G_y/G$ of a component $G_y$ in the second direction of gravitational acceleration G to gravitational acceleration G. Controller 30 calculates the first angle ($\alpha$, $\beta$) that is the attitude angle of substrate 13 from first signal 31b. Controller 30 calculates the second angle ($-\alpha/2$, $-\beta/2$) that is the angle by which reflection member 20 is inclined from the first angle ($\alpha$, $\beta$).

With reference to FIGS. 30 to 33, the action of optical scanning apparatus 1b when vehicle 5b in which optical scanning apparatus 1b is incorporated moves toward traveling direction 7 at constant velocity on an inclined surface 47b or when vehicle 5b stands still on inclined surface 47b will be described. In the second embodiment, inclined surface 47b is inclined with respect to the horizontal surface 45 by the angle $\alpha$ in the first direction (for example, the x-direction) and by the angle in the second direction (for example, the y-direction). The inclined surface 47b is inclined with respect to the horizontal surface 45 by the angle $\alpha$ in the first direction (for example, the x-direction) that is traveling direction 7 of vehicle 5b, and by the angle $\beta$ in the width direction (for example, the second direction) of vehicle 5b.

Figure 31:
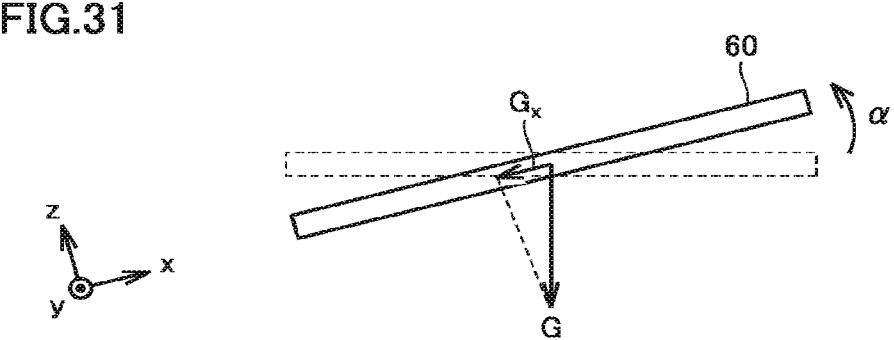
FIG. 31 is a partially enlarged side view schematically illustrating the attitude detector included in the optical scanning apparatus according to the second embodiment of the present invention.

As illustrated in FIGS. 31 and 33, vehicle 5b in which optical scanning apparatus 1b is incorporated moves toward traveling direction 7 at constant speed on inclined surface 47b, or vehicle 5b stands still on inclined surface 47b, whereby the force along the first direction (for example, the x-direction) and the second direction (for example, the y-direction) acts on inertial mass body 60 of attitude detector 18b. Specifically, acceleration acting on inertial mass body 60 along the first direction (for example, the x-direction) is provided by dividing the component (for example, the x-component) in the first direction of the force by the mass of inertial mass body 60. The acceleration acting on inertial mass body 60 along the first direction (for example, the x-direction) is equal to component (for example, an x-component) $G_x$ in the first direction of gravitational acceleration G (see FIG. 31). The acceleration acting on inertial mass body 60 along the second direction (for example, the y-direction) is provided by dividing the component (for example, the y-component) in the second direction of the force by the mass of inertial mass body 60. The acceleration acting on inertial mass body 60 along the second direction (for example, the y-direction) is equal to component (for example, a y-component) $G_y$ in the second direction of gravitational acceleration G (see FIG. 33).

Inertial mass body 60 is displaced along the first direction (for example, the x-direction) with respect to first fixed units 13f, 13g of substrate 13 by the force acting on inertial mass body 60, and the capacitance formed between first movable interdigital electrodes 65, 66 and first fixed interdigital electrodes 67, 68 changes. Inertial mass body 60 is displaced along the second direction (for example, the y-direction) with respect to second fixed units 13h, 13i of substrate 13 by the force acting on inertial mass body 60, and the capacitance formed between second movable interdigital electrodes 65b, 66b and second fixed interdigital electrodes 67b, 68b changes.

Attitude detector 18b outputs first signal 31b corresponding to the attitude angle of substrate 13 to controller 30 based on the changed capacitance. First signal 31b includes the first sub-signal indicating ratio $G_x/G$ of component $G_x$ in the first direction of gravitational acceleration G to gravitational acceleration G and the second sub-signal indicating ratio $G_y/G$ of component $G_y$ in the second direction of gravitational acceleration G to gravitational acceleration G.

Controller 30 calculates the first angle ($\alpha$, $\beta$) that is the attitude angle of substrate 13 from first signal 31b. Specifically, controller 30 calculates the first angle ($\alpha$), which is the attitude angle of substrate 13 in the first direction (for example, the x-direction), from the first sub signal. Controller 30 calculates the first angle ($\beta$), which is the attitude angle of substrate 13 in the second direction (for example, the y-direction), from the second sub signal. Specifically, controller 30 may calculate the first angle ($\alpha$), which is the attitude angle of substrate 13 in the first direction (for example, the x-direction), from the arcsine function of the first sub signal. The first angle ($\alpha$) may be given by the above equation (2). Controller 30 may calculate the first angle ($\beta$), which is the attitude angle of substrate 13 in the second direction (for example, the y-direction), from the arcsine function of the second sub signal. The first angle ($\beta$) may be given by the following equation (3).

$$\beta=\sin^{-1}(G_y/G) \qquad (3)$$

Controller 30 calculates a second angle ($-\alpha/2$) from the first angle ($\alpha$). The second angle ($-\alpha/2$) is $-0.5$ times the first angle ($\alpha$). Controller 30 controls first drive unit 25b to incline reflection member 20 by the second angle ($-\alpha/2$) about the axis (for example, the y-axis) along the second direction. That is, the absolute value of the second angle ($-\alpha/2$) is a half of the absolute value of the first angle ($\alpha$), and the direction in which reflection member 20 is inclined is opposite to the inclination direction of substrate 13 (or the inclination direction of optical scanning apparatus 1b) Controller 30 calculates the second angle ($-\beta/2$) from the first angle ($\beta$). The second angle ($-\beta/2$) is $-0.5$ times the first angle ($\beta$). Controller 30 controls first drive unit 25b to incline reflection member 20 by the second angle ($-\beta/2$) about the axis (for example, the x-axis) along the first direction. That is, the absolute value of the second angle ($-\beta/2$) is a half of the absolute value of the first angle ($\beta$), and the direction in which reflection member 20 is inclined is opposite to the inclination direction of substrate 13 (or the inclination direction of optical scanning apparatus 1b)

In this way, even if vehicle 5b in which optical scanning apparatus 1b is incorporated moves toward traveling direction 7 at a constant speed on inclined surface 47b, or even if vehicle 5b stands still on inclined surface 47b, the outgoing angle of light beam 11 from optical scanning apparatus 1b with respect to horizontal surface 45 can be maintained regardless of the inclination of optical scanning apparatus 1b with respect to horizontal surface 45. Specifically, light beam 11 is output from optical scanning apparatus 1b in the horizontal direction regardless of the inclination of optical scanning apparatus 1b with respect to horizontal surface 45.

Figure 35:
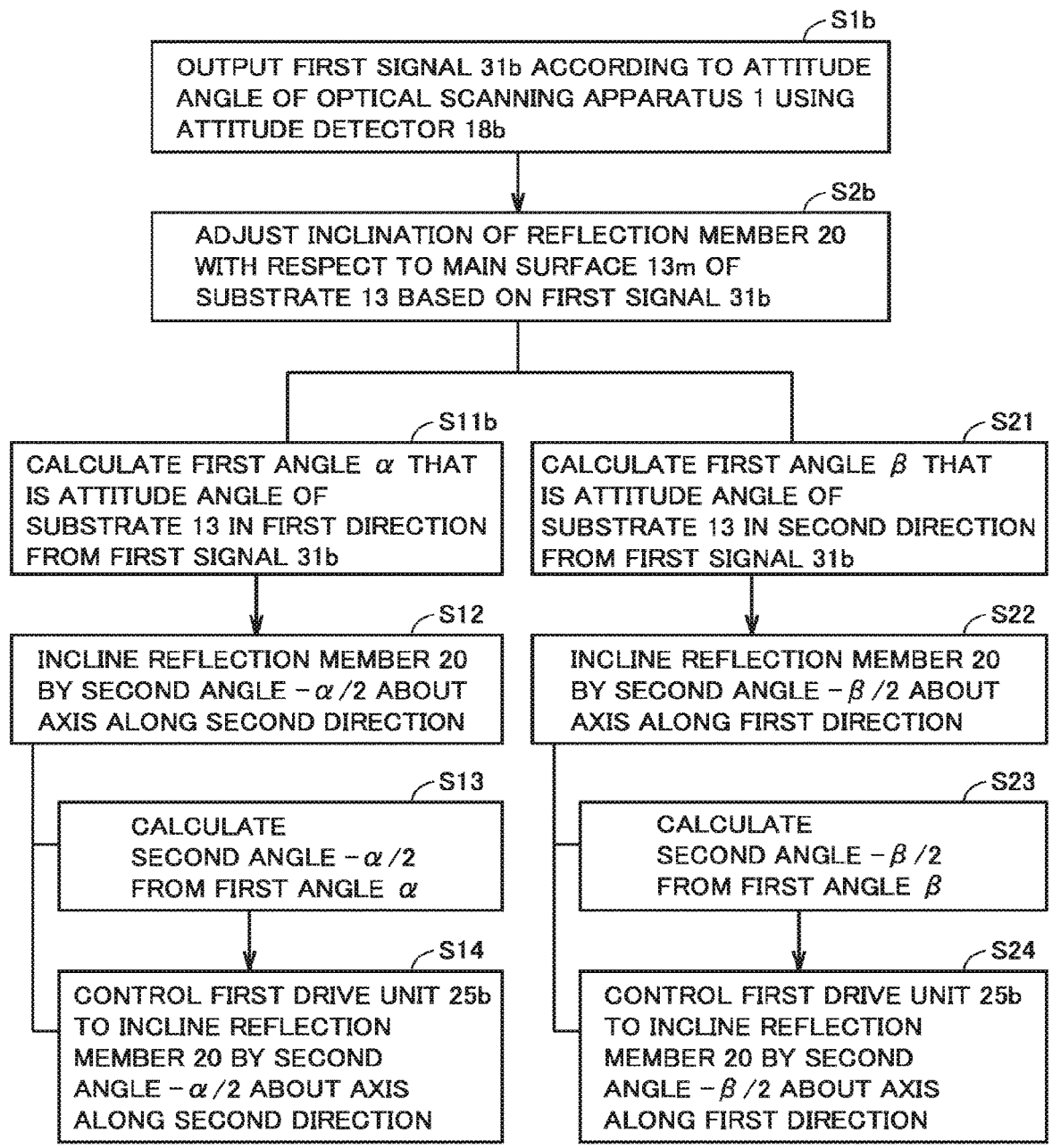
FIG. 35 is a view illustrating a flowchart of a method for controlling the optical scanning apparatus according to the second embodiment of the present invention.
Figure 36:
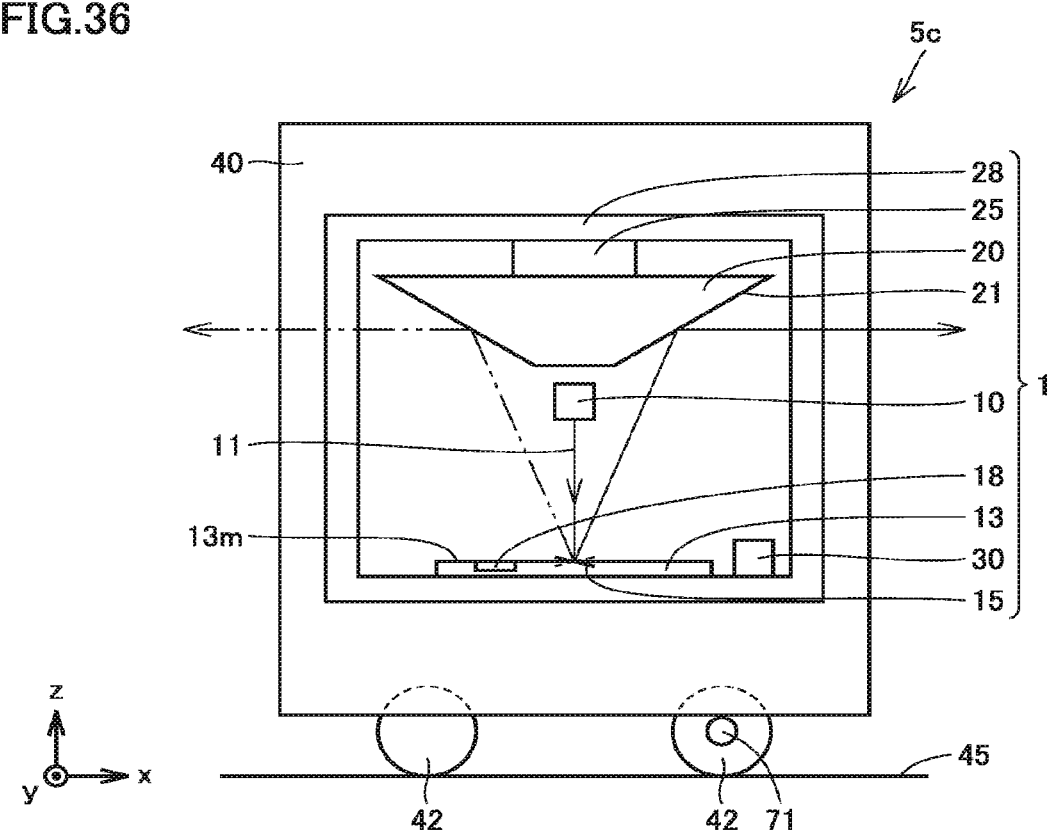
FIG. 36 is a side view schematically illustrating an optical scanning apparatus according to a third embodiment of the present invention.

With reference to FIG. 35, a method for controlling optical scanning apparatus 1b of the second embodiment will be described. The method for controlling optical scanning apparatus 1b of the second embodiment includes the same processes as the method for controlling optical scanning apparatus 1 of the first embodiment, but differs mainly from the method for controlling optical scanning apparatus 1 of the first embodiment in the following points.

The method for controlling optical scanning apparatus 1b of the second embodiment includes outputting first signal 31b according to the attitude angle of substrate 13 using attitude detector 18b (S1b). Specifically, attitude detector 18b may output first signal 31b according to the attitude angle of substrate 13 in two directions (the first direction (for example, the x-direction) and the second direction (for example, the y-direction)) intersecting with each other in main surface 13m of substrate 13. In the second embodiment, first signal 31b includes a first sub-signal indicating ratio $G_x/G$ of component $G_x$ in the first direction of gravitational acceleration G to gravitational acceleration G and a second sub-signal indicating a ratio $G_y/G$ of a component $G_y$ in the second direction of gravitational acceleration G to gravitational acceleration G.

The method for controlling optical scanning apparatus 1b of the second embodiment further includes adjusting the inclination of reflection member 20 with respect to main surface 13m of substrate 13 based on first signal 31b (S2b). Specifically, in the method for controlling optical scanning apparatus 1b of the second embodiment, adjusting the inclination of reflection member 20 (S2b) may include calculating the first angle ($\alpha$, $\beta$) that is the attitude angle of substrate 13 from first signal 31b (S11b, S21) and inclining reflection member 20 by the second angle ($-\alpha/2$, $-\beta/2$) (S12, S22).

Calculating the first angle ($\alpha$) that is the attitude angle of substrate 13 from first signal 31b (S11b) may be calculating the first angle ($\alpha$) that is the attitude angle of substrate 13 in the first direction (for example, the x-direction) from the arcsine function of the first sub-signal. The first angle ($\alpha$) may be given by the equation (2). Inclining reflection member 20 by the second angle ($-\alpha/2$) about the axis (for example, the y-axis) along the second direction (S12) may include calculating the second angle ($-\alpha/2$) from the first angle ($\alpha$) (S13) and controlling first drive unit 25b to incline reflection member 20 by the second angle ($-\alpha/2$) about the axis (for example, the y-axis) along the second direction (S14). The second angle ($-\alpha/2$) may be $-0.5$ times the first angle ($\alpha$). An absolute value of the second angle ($-\alpha/2$) is a half of an absolute value of the first angle ($\alpha$), and the direction in which reflection member 20 is inclined is opposite to the inclination direction of substrate 13 (or the inclination direction of optical scanning apparatus 1)

Calculating the first angle ($\beta$) that is the attitude angle of substrate 13 from first signal 31b (S21) may be calculating the first angle ($\beta$) that is the attitude angle of substrate 13 in the second direction (for example, the y-direction) from the arcsine function of second sub-signal. The first angle ($\beta$) may be given by the equation (3). Inclining reflection member 20 by the second angle ($-\beta/2$) about the axis (for example, the x-axis) along the first direction (S22) may include calculating the second angle ($-\beta/2$) from the first angle ($\beta$) (S23) and controlling first drive unit 25b to incline reflection member 20 by the second angle ($-\beta/2$) about the axis (for example, the x-axis) along the first direction (S24). The second angle ($-\beta/2$) may be $-0.5$ times the first angle ($\beta$). The absolute value of the second angle ($-\beta/2$) is a half of the absolute value of the first angle ($\beta$), and the direction in which reflection member 20 is inclined is opposite to the inclination direction of substrate 13 (or the inclination direction of optical scanning apparatus 1)

The advantageous effects of optical scanning apparatus 1b of the first embodiment, the method for controlling optical scanning apparatus 1b, and vehicle 5b will be described. In addition to the advantageous effects of optical scanning apparatus 1, the method for controlling optical scanning apparatus 1, and vehicle 5 of the first embodiment, optical scanning apparatus 1b, the method for controlling optical scanning apparatus 1b, and vehicle 5b of the second embodiment have the following advantageous effects.

In optical scanning apparatus 1b of the second embodiment, attitude detector 18b may be configured to output first signal 31b according to the attitude angle of substrate 13 in two directions (the first direction (for example, the x-direction) and the second direction (for example, the y-direction)) intersecting with each other in main surface 13m of substrate 13. In optical scanning apparatus 1b of the second embodiment, the outgoing angle of light beam 11 from optical scanning apparatus 1b with respect to horizontal surface 45 can stably be maintained regardless of the inclination of optical scanning apparatus 1b with respect to horizontal surface 45 in two directions (the first direction (for example, the x-direction) and the second direction (for example, the y-direction)) intersecting with each other in main surface 13m of substrate 13.

The vehicle 5b of the second embodiment includes optical scanning apparatus 1b. In vehicle 5b of the second embodiment, even if vehicle 5b in which optical scanning apparatus 1b is incorporated moves on inclined surface 47b inclined in two directions (the first direction(for example, the x-direction) and the second direction (for example, the y-direction) intersecting with each other in main surface 13m of substrate 13, the outgoing angle of light beam 11 from optical scanning apparatus 1b with respect to horizontal surface 45 can stably be maintained.

In the method for controlling optical scanning apparatus 1b of the second embodiment, attitude detector 18b may output first signal 31b according to the attitude angle of substrate 13 in two directions (the first direction (for example, the x-direction) and the second direction (for example, the y-direction)) intersecting with each other in main surface 13m of substrate 13. In the method for controlling optical scanning apparatus 1b of the second embodiment, the outgoing angle of light beam 11 from optical scanning apparatus 1b with respect to horizontal surface 45 can stably be maintained regardless of the inclination of optical scanning apparatus 1b with respect to horizontal surface 45 in two directions (the first direction (for example, the x-direction) and the second direction (for example, the y-direction)) intersecting with each other in main surface 13m of substrate 13.

In the method for controlling optical scanning apparatus 1b of the second embodiment, adjusting the inclination of reflection member 20 (S2b) may include calculating the first angle ($\alpha$, $\beta$) that is the attitude angle of substrate 13 from the arcsine function of first signal 31b (S11b, S21) and inclining reflection member 20 by the second angle ($-\alpha/2$, $-\beta/2$) (S12, S22). The second angle ($-\alpha/2$, $-\beta/2$) may be $-0.5$ times the first angle ($\alpha$, $\beta$). In the method for controlling optical scanning apparatus 1b of the second embodiment, the outgoing angle of light beam 11 from optical scanning apparatus 1b with respect to horizontal surface 45 can stably be maintained regardless of the inclination of optical scanning apparatus 1b with respect to horizontal surface 45 in two directions (the first direction (for example, the x-direction) and the second direction (for example, the y-direction)) intersecting with each other in main surface 13m of substrate 13.

Third Embodiment

With reference to FIGS. 36 to 39, optical scanning apparatus 1 and a vehicle 5c according to a third embodiment will be described. Optical scanning apparatus 1 and vehicle 5c of the third embodiment have the same configurations as optical scanning apparatus 1 and vehicle 5 of the first embodiment, but differ mainly from optical scanning apparatus 1 and vehicle 5 of the first embodiment in the following points.

Vehicle 5c of the third embodiment further includes a vehicle acceleration detector 70 configured to obtain acceleration $A_x$ of vehicle 5c. Specifically, vehicle acceleration detector 70 may include a wheel speed sensor 71 and a computing unit 72. Wheel speed sensor 71 is configured to detect a rotation angular velocity co of a wheel 42. Computing unit 72 is configured to calculate acceleration $A_x$ of vehicle 5c from rotation angular velocity co of wheel 42. Specifically, calculating acceleration $A_x$ of vehicle 5c from rotation angular velocity co of wheel 42 may include calculating a velocity v of vehicle 5c in the first direction (for example, the x-direction) that is traveling direction 7 from rotation angular velocity co of wheel 42 and calculating acceleration $A_x$ of vehicle 5c in the first direction (for example, the x-direction) that is traveling direction 7 from velocity v. Calculating velocity v of vehicle 5c from rotation angular velocity $\omega$ of wheel 42 may include multiplying rotation angular velocity $\omega$ of wheel 42 by a radius r of wheel 42. Calculating acceleration $A_x$ of vehicle 5c from velocity v of vehicle 5c may include differentiating velocity v of vehicle 5c with respect to time.

Controller 30 is configured to control first drive unit 25 based on a first signal 31c output from attitude detector 18 and acceleration $A_x$ of vehicle 5c obtained by the vehicle acceleration detector 70. Specifically, controller 30 receives first signal 31c output from attitude detector 18 and acceleration $A_x$ of vehicle 5c. First signal 31c includes ratio $G_x/G$ of component $G_x$ in the first direction of gravitational acceleration G to gravitational acceleration G and acceleration $A_x$ of vehicle 5c in traveling direction 7. Controller 30 calculates the first angle ($\alpha$) that is the attitude angle of substrate 13 from first signal 31c and acceleration $A_x$ of vehicle 5c. Specifically, controller 30 corrects first signal 31c by a contribution of acceleration $A_x$ of vehicle 5c included in first signal 31c (acceleration $-A_x$ of inertia force acting on inertial mass body 60) to obtain a second signal. Controller 30 calculates the first angle ($\alpha$) that is the attitude angle of substrate 13 from the second signal. Controller 30 calculates a second angle ($-\alpha/2$) that is an angle by which reflection member 20 is inclined from the first angle ($\alpha$).

Figure 37:
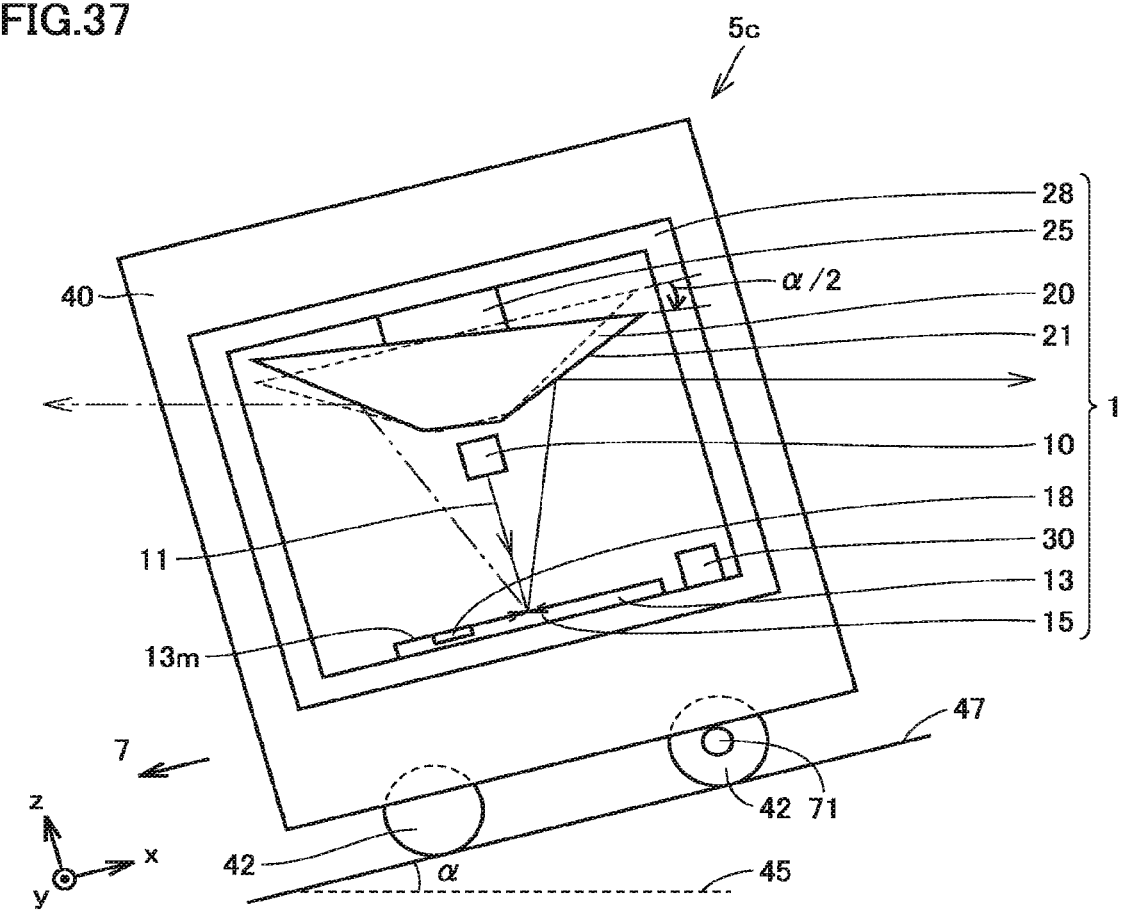
FIG. 37 is a side view schematically illustrating the optical scanning apparatus according to the third embodiment of the present invention.
Figure 38:
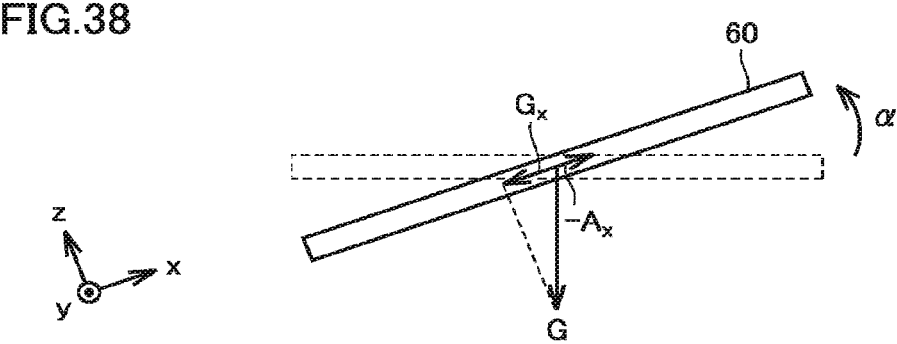
FIG. 38 is a partially enlarged side view schematically illustrating the attitude detector included in the optical scanning apparatus according to the third embodiment of the present invention.
Figure 39:
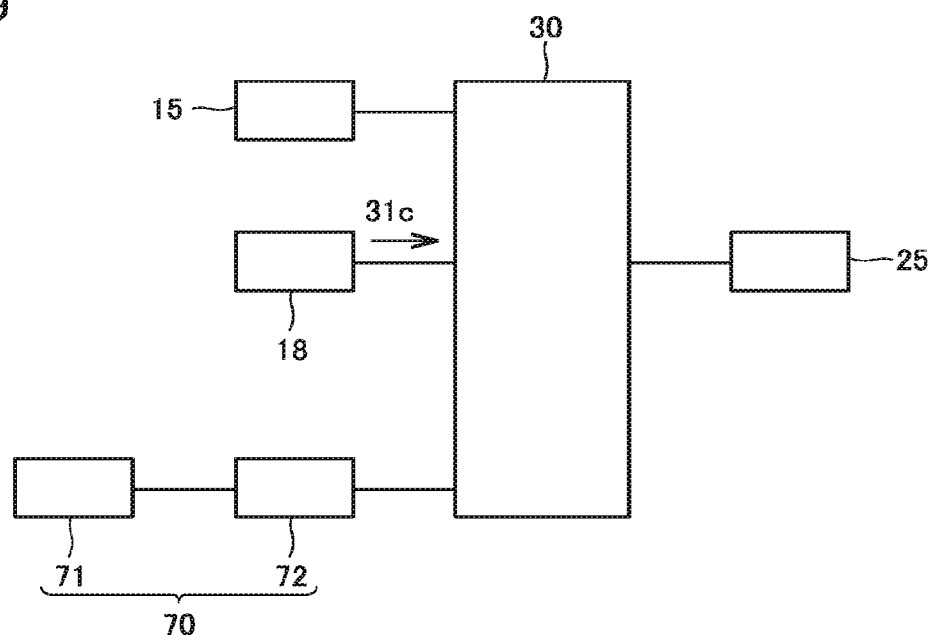
FIG. 39 is a control block diagram illustrating the optical scanning apparatus according to the third embodiment of the present invention.

With reference to FIGS. 37 and 38, the action of optical scanning apparatus 1 when vehicle 5c into which optical scanning apparatus 1 is incorporated moves with acceleration $A_x$ toward traveling direction 7 on the inclined surface 47 will be described. In the third embodiment, inclined surface 47 is inclined with respect to horizontal surface 45 by the angle $\alpha$ in the first direction (for example, the x-direction) that is traveling direction 7 of vehicle 5c. In the third embodiment, inclined surface 47 is not inclined in the second direction (for example, the y-direction) with respect to horizontal surface 45.

Because vehicle 5c into which optical scanning apparatus 1 is incorporated moves with acceleration $A_x$ toward traveling direction 7 on inclined surface 47, the force along the first direction (for example, the x-direction) acts on inertial mass body 60 of attitude detector 18. Specifically, acceleration acting on inertial mass body 60 along the first direction (for example, the x-direction) is provided by dividing the force by a mass of inertial mass body 60. The acceleration acting on inertial mass body 60 along the first direction (for example, the x-direction) is equal to a sum of a component (for example, the x-component) $G_x$ in the first direction of gravitational acceleration G and acceleration $-A_x$ of the inertial force acting on inertial mass body 60 due to the motion of vehicle 5c with acceleration $A_x$.

Inertial mass body 60 is displaced along the first direction (for example, the x-direction) with respect to first fixed units 13f, 13g of substrate 13 by the force acting on inertial mass body 60, and the capacitance formed between first movable interdigital electrodes 65, 66 and first fixed interdigital electrodes 67, 68 changes. Attitude detector 18 outputs first signal 31c corresponding to the attitude angle of substrate 13 to controller 30 based on the changed capacitance. In the third embodiment, first signal 31c includes ratio $G_x/G$ of component $G_x$ in the first direction of gravitational acceleration G to gravitational acceleration G and acceleration $-A_x$ of the inertial force acting on inertial mass body 60.

Controller 30 corrects first signal 31c by the contribution of acceleration $A_x$ of vehicle 5c included in first signal 31c (acceleration $-A_x$ of inertia force acting on inertial mass body 60) to obtain a second signal. Controller 30 calculates the first angle ($\alpha$) that is the attitude angle of substrate 13 from the second signal. Specifically, controller 30 may calculate the first angle ($\alpha$) that is the attitude angle of substrate 13 from the arcsine function of the second signal. The first angle ($\alpha$) may be given by the equation (2).

Controller 30 calculates a second angle ($-\alpha/2$) from the first angle ($\alpha$). The second angle ($-\alpha/2$) is $-0.5$ times the first angle ($\alpha$). Controller 30 controls first drive unit 25 to incline reflection member 20 by the second angle ($-\alpha/2$) about an axis (for example, a y-axis) along the second direction. The absolute value of the second angle ($-\alpha/2$) is a half of the absolute value of the first angle ($\alpha$), and the direction in which reflection member 20 is inclined is opposite to the inclination direction of substrate 13 (or the inclination direction of optical scanning apparatus 1) In this way, even if vehicle 5c in which optical scanning apparatus 1 is incorporated moves with acceleration $A_x$ toward traveling direction 7 on inclined surface 47, the outgoing angle of light beam 11 from optical scanning apparatus 1 with respect to horizontal surface 45 can be maintained regardless of the inclination of optical scanning apparatus 1 with respect to horizontal surface 45. Specifically, light beam 11 is output from optical scanning apparatus 1 in the horizontal direction regardless of the inclination of optical scanning apparatus 1 with respect to horizontal surface 45.

Figure 40:
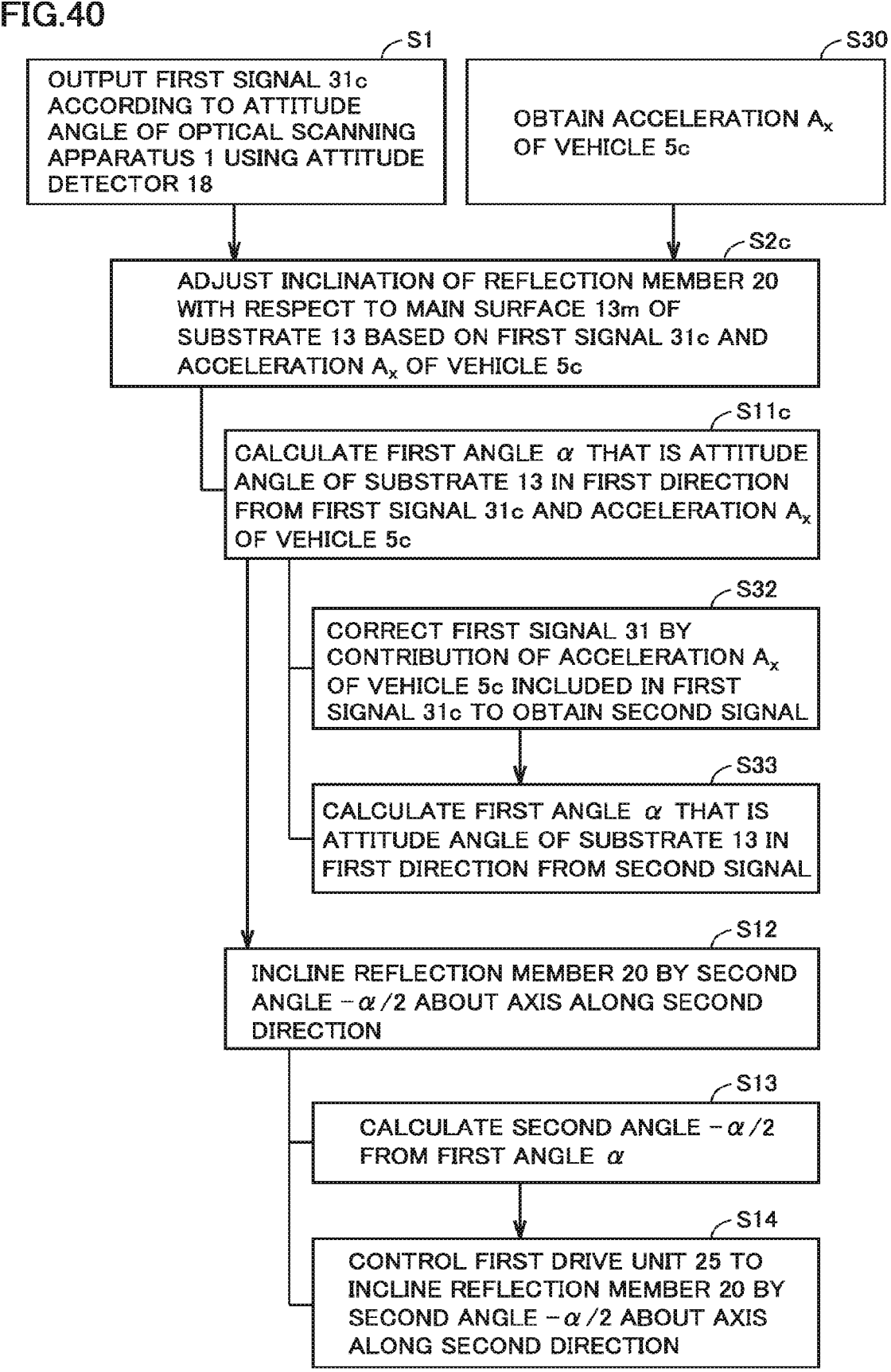
FIG. 40 is a view illustrating a flowchart of a method for controlling the optical scanning apparatus according to the third embodiment of the present invention.
Figure 41:
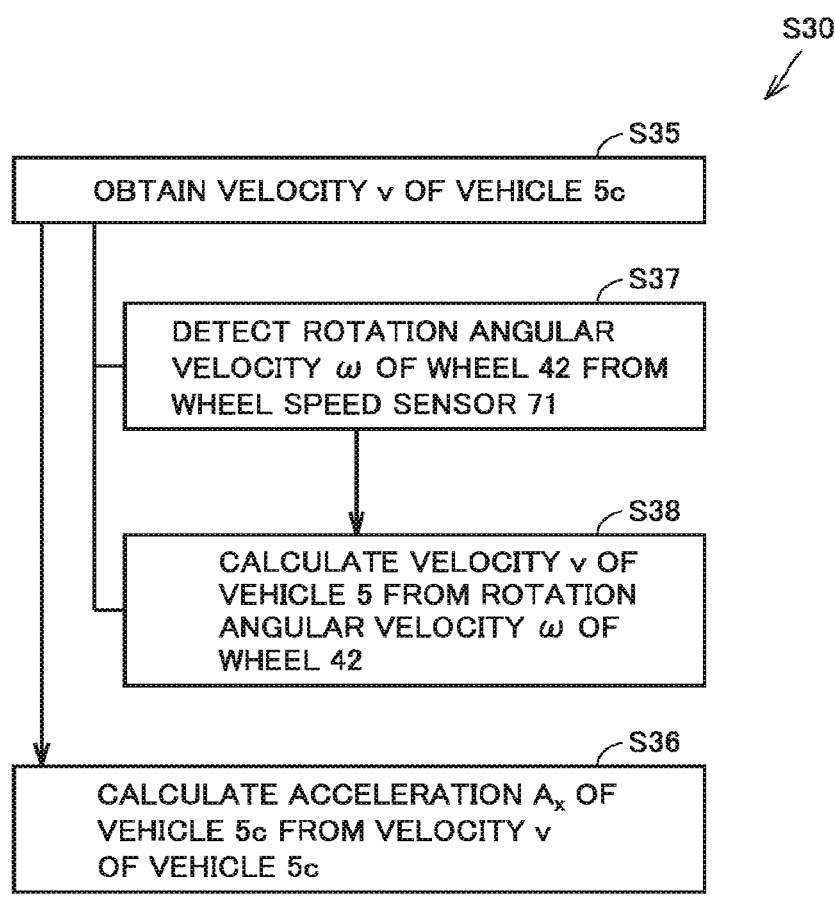
FIG. 41 is a view illustrating a flowchart of a process for obtaining acceleration of a vehicle included in the method for controlling the optical scanning apparatus according to the third embodiment of the present invention.

With reference to FIGS. 40 and 41, a method for controlling optical scanning apparatus 1 of the third embodiment will be described. The method for controlling optical scanning apparatus 1 of the third embodiment includes the same processes as the method for controlling optical scanning apparatus 1 of the first embodiment, but differs mainly from the method for controlling optical scanning apparatus 1 of the first embodiment in the following points.

The method for controlling optical scanning apparatus 1 of the third embodiment includes outputting first signal 31c according to the attitude angle of substrate 13 using attitude detector 18 (S1). Specifically, attitude detector 18 may output first signal 31c according to the attitude angle of substrate 13 in one direction (for example, the x-direction) in main surface 13m of substrate 13. In the third embodiment, first signal 31c includes ratio $G_x/G$ of component $G_x$ in the first direction of gravitational acceleration G to gravitational acceleration G and acceleration $-A_x$ of the inertial force acting on inertial mass body 60.

The method for controlling optical scanning apparatus 1 of the third embodiment further includes obtaining acceleration $A_x$ of vehicle 5c into which optical scanning apparatus 1 is incorporated (S30). Specifically, vehicle acceleration detector 70 obtains acceleration $A_x$ of vehicle 5c. As illustrated in FIG. 41, obtaining acceleration $A_x$ f vehicle 5c may include obtaining velocity v of vehicle 5c (S35) and obtaining acceleration $A_x$ of vehicle 5c from velocity v of vehicle 5c (S36). Obtaining velocity v of vehicle 5c (S35) may include detecting rotation angular velocity $\omega$ of wheel 42 from wheel speed sensor 71 (S37) and calculating velocity v of vehicle 5c from rotation angular velocity co of wheel 42 (S38). Calculating velocity v of vehicle 5c from rotation angular velocity co of wheel 42 may include multiplying rotation angular velocity a of wheel 42 by a radius r of wheel 42. Calculating acceleration $A_x$ of vehicle 5c from velocity v of vehicle 5c may include differentiating velocity v of vehicle 5c with respect to time.

The method for controlling optical scanning apparatus 1 of the third embodiment includes adjusting the inclination of reflection member 20 with respect to main surface 13m of substrate 13 based on first signal 31c and acceleration $A_x$ of vehicle 5c (S2). Specifically, in the method for controlling optical scanning apparatus 1 of the third embodiment, adjusting the inclination of reflection member 20 (S2c) may include calculating the first angle ($\alpha$) that is the attitude angle of substrate 13 from first signal 31c and acceleration $A_x$ of vehicle 5c (S11c) and inclining reflection member 20 by the second angle ($-\alpha/2$) about the axis (for example, the y-axis) along the second direction (S12).

Calculating the first angle ($\alpha$) that is the attitude angle of substrate 13 from first signal 31c and acceleration $A_x$ of vehicle 5c (S11c) may include correcting first signal 31c by the contribution (acceleration $-A_x$ of the inertial force acting on inertial mass 60) of acceleration $A_x$ of vehicle 5c included in first signal 31c to obtain the second signal (S32) and calculating, from the second signal, the first angle ($\alpha$) that is the attitude angle of substrate 13 in the first direction (S33). Calculating the first angle ($\alpha$) that is the attitude angle of substrate 13 in the first direction from the second signal (S33) may be calculating the first angle ($\alpha$) that is the attitude angle of substrate 13 from the arcsine function of the second signal. The first angle ($\alpha$) may be given by the equation (2).

Inclining reflection member 20 by the second angle ($-\alpha/2$) (S12) may include calculating the second angle ($-\alpha/2$) from the first angle ($\alpha$) (S13) and controlling first drive unit 25 to incline reflection member 20 by the second angle ($-\alpha/2$) about the axis (for example, the y-axis) along the second direction (S14). The second angle ($-\alpha/2$) may be $-0.5$ times the first angle ($\alpha$). An absolute value of the second angle ($-\alpha/2$) is a half of an absolute value of the first angle ($\alpha$), and the direction in which reflection member 20 is inclined is opposite to the inclination direction of substrate 13 (or the inclination direction of optical scanning apparatus 1)

The advantageous effects of vehicle 5c and the method for controlling optical scanning apparatus 1 of the third embodiment will be described. In addition to the advantageous effects of vehicle 5 and the method for controlling optical scanning apparatus 1 of the first embodiment, vehicle 5c and the method for controlling optical scanning apparatus 1 of the third embodiment has the following advantageous effects.

Vehicle 5c of the third embodiment includes optical scanning apparatus 1 and vehicle acceleration detector 70 configured to obtain acceleration $A_x$ of vehicle 5c. Controller 30 is configured to control the drive unit (first drive unit 25) based on first signal 31c output from attitude detector 18 and acceleration $A_x$ of vehicle 5c. In vehicle 5c of the third embodiment, the outgoing angle of light beam 11 from optical scanning apparatus 1 with respect to horizontal surface 45 can stably be maintained even if vehicle 5c into which the optical scanning apparatus 1 is incorporated moves with acceleration $A_x$ on inclined surface 47.

Vehicle 5c of the third embodiment further includes wheel 42. Vehicle acceleration detector 70 includes wheel speed sensor 71 and computing unit 72. Wheel speed sensor 71 is configured to detect a rotation angular velocity $\omega$ of a wheel 42. Computing unit 72 is configured to calculate acceleration $A_x$ of vehicle 5c from rotation angular velocity $\omega$. In vehicle 5c of the third embodiment, the outgoing angle of light beam 11 from optical scanning apparatus 1 with respect to horizontal surface 45 can stably be maintained even if vehicle 5c into which the optical scanning apparatus 1 is incorporated moves with acceleration $A_x$ toward traveling direction 7 on inclined surface 47.

The method for controlling optical scanning apparatus 1 of the third embodiment further includes obtaining the acceleration of vehicle 5c into which optical scanning apparatus 1 is incorporated (S30). The inclination of reflection member 20 with respect to main surface 13m of substrate 13 is adjusted based on first signal 31c and acceleration $A_x$ of vehicle 5c. In the method for controlling optical scanning apparatus 1 of the third embodiment, the outgoing angle of light beam 11 from optical scanning apparatus 1 with respect to horizontal surface 45 can stably be maintained even if vehicle 5c into which the optical scanning apparatus 1 is incorporated moves with acceleration $A_x$ on inclined surface 47.

In the method for controlling optical scanning apparatus 1 of the third embodiment, adjusting the inclination of reflection member 20 (S2c) may include correcting first signal 31c by the contribution of acceleration $A_x$ of vehicle 5c included in first signal 31c to obtain the second signal (S32), calculating the first angle ($\alpha$) that is the attitude angle of substrate 13 from the arcsine function of the second signal (S33), and inclining reflection member 20 by the second angle ($-\alpha/2$) (S12) The second angle ($-\alpha/2$) may be $-0.5$ times the first angle ($\alpha$). In the method for controlling optical scanning apparatus 1 of the third embodiment, the outgoing angle of light beam 11 from optical scanning apparatus 1 with respect to horizontal surface 45 can stably be maintained even if vehicle 5c into which the optical scanning apparatus 1 is incorporated moves with acceleration $A_x$ on inclined surface 47.

It should be considered that the disclosed first to third embodiments and the modifications of the first embodiment are examples in all respects and not restrictive. As long as there is no contradiction, at least two of the disclosed first to third embodiments and the modifications of the first embodiment may be combined. The scope of the present invention is defined by not the above description but the claims, and it is intended that all modifications within the meaning and scope of the claims are included in the present invention.

REFERENCE SIGNS LIST 1, 1b: optical scanning apparatus, 5, 5b, 5c: vehicle, 7: traveling direction, 10: light source, 11: light beam, 12: optical axis, 13: substrate, 13f, 13g: first fixed unit, 13h, 13i: second fixed unit, 13m: main surface, 15: scanning mirror, 16: normal, 18, 18b: attitude detector, 20: reflection member, 21: reflection surface, 23: center axis, 25, 25b: first drive unit, 27: fixed mirror, 28: casing, 30: controller, 31, 31b, 31c: first signal, 40: main body, 42: wheel, 45: horizontal surface, 47, 47b: inclined surface, 50: reflection mirror, 51, 52, 53: first beam, 56, 57, 58: connection unit, 60: inertial mass body, 60a: first side surface, 60b: second side surface, 60c: third side surface, 60d: fourth side surface, 61, 62, 63, 64: second beam, 65, 66: first movable interdigital electrode, 65b, 66b: second movable interdigital electrode, 67, 68: first fixed interdigital electrode, 67b, 68b: second fixed interdigital electrode, 70: vehicle acceleration detector, 71: wheel speed sensor, 72: computing unit, 101: nonconductive substrate, 102: first insulating layer, 103: first conductive semiconductor layer, 105: second insulating layer, 106: first electrode layer, 110: piezoelectric layer, 112: gold layer

The invention claimed is:
1. An optical scanning apparatus comprising:
a light source;
a substrate, a scanning mirror and an attitude detector being integrated with the substrate, the scanning mirror being configured to reflect a light beam emitted from the light source and perform scanning with the light beam, the scanning mirror being provided on a main surface of the substrate, the attitude detector being configured to output a first signal according to an attitude angle of the substrate;
a reflector configured to reflect the light beam reflected by the scanning mirror;
a driver configured to adjust an inclination of the reflector with respect to the main surface of the substrate; and
a controller configured to control the driver based on the first signal.

2. The optical scanning apparatus according to claim 1, wherein the attitude detector includes one of an acceleration sensor and an inclinometer.

3. The optical scanning apparatus according to claim 1, wherein the attitude detector includes a micro-electro-mechanical systems (MEMS) acceleration sensor.

4. The optical scanning apparatus according to claim 1, wherein the attitude detector is configured to output the first signal according to the attitude angle of the substrate in one direction in the main surface of the substrate.

5. The optical scanning apparatus according to claim 1, wherein the attitude detector is configured to output the first signal according to the attitude angle of the substrate in two directions intersecting with each other in the main surface of the substrate.

6. The optical scanning apparatus according to claim 1, wherein the scanning mirror is a two-dimensional scanning mirror.

7. The optical scanning apparatus according to claim 1, wherein the scanning mirror is configured to perform swing motion about an optical axis of the light beam incident on the scanning mirror while an incident angle of the light beam with respect to the scanning mirror is maintained.

8. The optical scanning apparatus according to claim 1, wherein the scanning mirror is configured to perform swing motion about an optical axis of the light beam incident on the scanning mirror while an incident angle of the light beam with respect to the scanning mirror changes.

9. A vehicle comprising the optical scanning apparatus according to claim 1.

10. The vehicle according to claim 9, further comprising a vehicle acceleration detector configured to obtain acceleration of the vehicle, wherein
the controller is configured to control the driver based on the first signal output from the attitude detector and the acceleration of the vehicle.

11. The vehicle according to claim 10, further comprising a wheel, wherein
the vehicle acceleration detector includes a wheel speed sensor and a processor,
the wheel speed sensor is configured to detect a rotation angular velocity of the wheel, and the processor is configured to calculate the acceleration of the vehicle from the rotational angular velocity.

12. A method for controlling an optical scanning apparatus,
the optical scanning apparatus including:
a light source;
a substrate, a scanning mirror and an attitude detector being integrated with the substrate, the scanning mirror being configured to reflect a light beam emitted from the light source and perform scanning with the light beam, the scanning mirror being provided on a main surface of the substrate; and
a reflector configured to reflect the light beam reflected by the scanning mirror,
the method for controlling the optical scanning apparatus, comprising:
outputting a first signal according to an attitude angle of the substrate using the attitude detector; and
adjusting an inclination of the reflector with respect to the main surface of the substrate based on the first signal.

13. The method for controlling the optical scanning apparatus according to claim 12, wherein the attitude detector outputs the first signal according to the attitude angle of the substrate in one direction in the main surface of the substrate.

14. The method for controlling the optical scanning apparatus according to claim 12, wherein the attitude detector outputs the first signal according to the attitude angle of the substrate in two directions intersecting with each other in the main surface of the substrate.

15. The method for controlling the optical scanning apparatus according to claim 13, wherein
adjusting the inclination of the reflector includes calculating a first angle that is the attitude angle of the substrate from an arcsine function of the first signal, and inclining the reflector by a second angle, and
the second angle is −0.5 times the first angle.

16. The method for controlling the optical scanning apparatus according to claim 12, further comprising obtaining acceleration of a vehicle into which the optical scanning apparatus is incorporated, wherein
the inclination of the reflector with respect to the light beam reflected by the scanning mirror is adjusted based on the first signal and the acceleration of the vehicle.

17. The method for controlling the optical scanning apparatus according to claim 16, wherein
adjusting the inclination of the reflector includes correcting the first signal by a contribution of the acceleration of the vehicle included in the first signal to obtain a second signal, calculating a first angle that is the attitude angle of the substrate from an arcsine function of the second signal, and inclining the reflection member by a second angle, and
the second angle is −0.5 times the first angle.

* * * * *